(12) United States Patent
Zarakas et al.

(10) Patent No.: US 10,579,990 B2
(45) Date of Patent: *Mar. 3, 2020

(54) DYNAMIC TRANSACTION CARD OPTIMIZATION

(71) Applicant: Capital One Services, LLC, McLean, VA (US)

(72) Inventors: James Zarakas, Centreville, VA (US); Brennon York, San Francisco, CA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/541,577

(22) Filed: Aug. 15, 2019

(65) Prior Publication Data
US 2019/0370782 A1   Dec. 5, 2019

Related U.S. Application Data

(63) Continuation of application No. 16/240,121, filed on Jan. 4, 2019, now Pat. No. 10,438,191, which is a
(Continued)

(51) Int. Cl.
*G06Q 20/34* (2012.01)
*H04L 29/08* (2006.01)

(52) U.S. Cl.
CPC ......... *G06Q 20/341* (2013.01); *G06Q 20/352* (2013.01); *G06Q 20/354* (2013.01); *G06Q 20/3563* (2013.01); *H04L 67/22* (2013.01)

(58) Field of Classification Search
None
See application file for complete search history.

(56) References Cited

U.S. PATENT DOCUMENTS

| 5,940,510 A | 8/1999 | Curry et al. |
| 5,949,880 A | 9/1999 | Curry et al. |

(Continued)

FOREIGN PATENT DOCUMENTS

WO    2010022129 A1    2/2010

OTHER PUBLICATIONS

Extended European Search Report in related EP application No. 16780706.4, dated Nov. 7, 2018.
(Continued)

*Primary Examiner* — Kristy A Haupt
(74) *Attorney, Agent, or Firm* — Troutman Sanders LLP; Christopher J. Forstner; John A. Morrissett

(57) ABSTRACT

The present disclosure relates to devices and methods relating to an optimized electronic transaction card where various data inputs associated with a dynamic transaction card optimize operational configurations and/or a user experience of the dynamic transaction card to extend an energy storage life of the dynamic transaction card, promote various behaviors, and/or detect system and/or device defects. A dynamic transaction card may include a dynamic transaction card with various configuration and/or functionality that use the power components (e.g., printed circuit board (PCB), energy storage component, battery, and/or the like) of the dynamic transaction card. The configuration and/or functionality data may include, for example, sensor input, connection data, transaction data, display data, and/or the like. The configuration and/or functionality data may then be used to determine optimal configuration settings.

20 Claims, 6 Drawing Sheets

Related U.S. Application Data continuation of application No. 15/099,008, filed on Apr. 14, 2016, now Pat. No. 10,210,505.

(60) Provisional application No. 62/270,384, filed on Dec. 21, 2015, provisional application No. 62/147,568, filed on Apr. 14, 2015.

(56) References Cited

U.S. PATENT DOCUMENTS

| | | | |
|---|---|---|---|
| 6,105,013 | A | 8/2000 | Curry et al. |
| 6,237,095 | B1 | 5/2001 | Curry et al. |
| 7,243,853 | B1 | 7/2007 | Levy et al. |
| 7,318,550 | B2 | 1/2008 | Bonalle et al. |
| 7,587,756 | B2 | 9/2009 | Peart et al. |
| 7,597,265 | B2 | 10/2009 | Bonalle et al. |
| 7,729,986 | B1 | 6/2010 | Hoffman et al. |
| 7,784,687 | B2 | 8/2010 | Mullen et al. |
| 7,793,845 | B2 | 9/2010 | Bonalle et al. |
| 7,793,851 | B2 | 9/2010 | Mullen |
| 7,798,415 | B1 | 9/2010 | Bates et al. |
| 7,815,126 | B2 | 10/2010 | Top |
| 7,828,220 | B2 | 11/2010 | Mullen |
| 7,874,492 | B2 | 1/2011 | Levy et al. |
| 7,931,195 | B2 | 4/2011 | Mullen |
| 7,946,501 | B2 | 5/2011 | Borracci |
| 7,953,671 | B2 | 5/2011 | Bishop et al. |
| 7,954,705 | B2 | 6/2011 | Mullen |
| 8,011,577 | B2 | 9/2011 | Mullen et al. |
| 8,016,191 | B2 | 9/2011 | Bonalle et al. |
| 8,019,684 | B2 | 9/2011 | Hoffman et al. |
| 8,020,775 | B2 | 9/2011 | Mullen et al. |
| 8,066,191 | B1 | 11/2011 | Cloutier et al. |
| 8,074,877 | B2 | 12/2011 | Mullen et al. |
| 8,078,532 | B2 | 12/2011 | Hoffman et al. |
| 8,082,211 | B2 | 12/2011 | Hoffman et al. |
| 8,095,113 | B2 | 1/2012 | Kean et al. |
| 8,172,148 | B1 | 5/2012 | Cloutier et al. |
| 8,215,563 | B2 | 7/2012 | Levy et al. |
| 8,282,007 | B1 | 10/2012 | Cloutier et al. |
| 8,286,876 | B2 | 10/2012 | Mullen et al. |
| 8,302,872 | B2 | 11/2012 | Mullen |
| 8,308,059 | B2 | 11/2012 | Granueci et al. |
| 8,322,623 | B1 | 12/2012 | Mullen et al. |
| 8,348,172 | B1 | 1/2013 | Cloutier et al. |
| 8,360,322 | B2 | 1/2013 | Bonalle et al. |
| 8,382,000 | B2 | 2/2013 | Mullen et al. |
| 8,393,545 | B1 | 3/2013 | Mullen et al. |
| 8,393,546 | B1 | 3/2013 | Yen et al. |
| 8,413,892 | B2 | 4/2013 | Mullen et al. |
| 8,417,631 | B2 | 4/2013 | Hoffman et al. |
| 8,424,773 | B2 | 4/2013 | Mullen et al. |
| 8,429,085 | B2 | 4/2013 | Faith et al. |
| 8,459,548 | B2 | 6/2013 | Mullen et al. |
| 8,485,437 | B2 | 7/2013 | Mullen et al. |
| 8,485,446 | B1 | 7/2013 | Mullen et al. |
| 8,489,513 | B2 | 7/2013 | Bishop et al. |
| 8,511,574 | B1 | 8/2013 | Yen et al. |
| 8,517,276 | B2 | 8/2013 | Mullen et al. |
| 8,523,059 | B1 | 9/2013 | Mullen et al. |
| 8,561,894 | B1 | 10/2013 | Mullen et al. |
| 8,567,679 | B1 | 10/2013 | Mullen et al. |
| 8,573,503 | B1 | 11/2013 | Cloutier et al. |
| 8,579,203 | B1 | 11/2013 | Lambeth et al. |
| 8,590,796 | B1 | 11/2013 | Cloutier et al. |
| 8,602,312 | B2 | 12/2013 | Cloutier et al. |
| 8,608,083 | B2 | 12/2013 | Mullen et al. |
| 8,622,309 | B1 | 1/2014 | Mullen et al. |
| 8,628,022 | B1 | 1/2014 | Rhoades et al. |
| 8,668,143 | B2 | 3/2014 | Mullen et al. |
| 8,727,219 | B1 | 5/2014 | Mullen |
| 8,733,638 | B2 | 5/2014 | Mullen et al. |
| 8,746,579 | B1 | 6/2014 | Cloutier et al. |
| 8,757,483 | B1 | 6/2014 | Mullen et al. |
| 8,757,499 | B2 | 6/2014 | Cloutier et al. |
| 8,805,746 | B2 | 8/2014 | Hoffman et al. |
| 8,811,959 | B2 | 8/2014 | Conner et al. |
| 8,814,050 | B1 | 8/2014 | Mullen et al. |
| 8,820,638 | B1 | 9/2014 | Cotter et al. |
| 8,827,153 | B1 | 9/2014 | Rhoades et al. |
| 8,870,081 | B2 | 10/2014 | Olson et al. |
| 8,875,999 | B2 | 11/2014 | Mullen et al. |
| 8,876,011 | B2 | 11/2014 | Olson et al. |
| 8,888,009 | B1 | 11/2014 | Mullen |
| 8,909,950 | B1 | 12/2014 | Levchuk et al. |
| 8,931,703 | B1 | 1/2015 | Mullen et al. |
| 8,944,333 | B1 | 2/2015 | Mullen et al. |
| 8,955,744 | B2 | 2/2015 | Granucci et al. |
| 8,960,545 | B1 | 2/2015 | Batra |
| 8,973,824 | B2 | 3/2015 | Mullen et al. |
| 10,210,505 | B2 * | 2/2019 | Zarakas ............... G06Q 20/341 |
| 2002/0195493 | A1 | 12/2002 | Dell |
| 2006/0213972 | A1 | 9/2006 | Kelly et al. |
| 2010/0213262 | A1 | 8/2010 | Hoeksel et al. |
| 2010/0332876 | A1 | 12/2010 | Fields et al. |
| 2012/0109735 | A1 | 5/2012 | Krawczewicz et al. |
| 2012/0254038 | A1 | 10/2012 | Mullen |
| 2013/0191288 | A1 | 7/2013 | Hoffman et al. |
| 2013/0217152 | A1 | 8/2013 | Mullen et al. |
| 2013/0218760 | A1 | 8/2013 | Faith et al. |
| 2013/0311363 | A1 | 11/2013 | Ramaci et al. |
| 2013/0320080 | A1 | 12/2013 | Olson et al. |
| 2013/0320081 | A1 | 12/2013 | Olson et al. |
| 2014/0001269 | A1 | 1/2014 | Hartwick et al. |
| 2014/0006277 | A1 | 1/2014 | Rao |
| 2014/0026213 | A1 | 1/2014 | Antebi et al. |
| 2014/0117094 | A1 | 5/2014 | Workley et al. |
| 2014/0129435 | A1 | 5/2014 | Pardo et al. |
| 2014/0138435 | A1 | 5/2014 | Khalid |
| 2014/0144984 | A1 | 5/2014 | Olson et al. |
| 2014/0164154 | A1 | 6/2014 | Ramaci |
| 2014/0175170 | A1 | 6/2014 | Bowers |
| 2014/0203902 | A1 | 7/2014 | Shippee et al. |
| 2014/0210589 | A1 | 7/2014 | Grace |
| 2014/0233166 | A1 | 8/2014 | O'Shea |
| 2014/0256251 | A1 | 9/2014 | Caceres et al. |
| 2014/0279476 | A1 | 9/2014 | Hua |
| 2014/0310184 | A1 | 10/2014 | Hoffman et al. |
| 2014/0339315 | A1 | 11/2014 | Ko |
| 2014/0379583 | A1 | 12/2014 | Hoffman et al. |
| 2015/0004934 | A1 | 1/2015 | Qian et al. |
| 2015/0006378 | A1 | 1/2015 | Blythe |
| 2015/0012440 | A1 | 1/2015 | Kelley et al. |
| 2015/0073983 | A1 | 3/2015 | Bartenstein et al. |
| 2015/0080077 | A1 | 3/2015 | Miller et al. |

OTHER PUBLICATIONS

Notification of Transmittal of the International Search Report and the Written Opinion of the International Searching Authority from Application No. PCT/US2016/027443 dated Jul. 26, 2016.

* cited by examiner

DYNAMIC TRANSACTION CARD OPTIMIZATION

CROSS REFERENCE TO RELATED APPLICATIONS

This application is a continuation of, and claims priority under 35 U.S.C. § 120 to, U.S. patent application Ser. No. 16/240,121, filed Jan. 4, 2019, which is a continuation of U.S. patent application Ser. No. 15/099,008, filed Apr. 14, 2016, which claims the benefit of U.S. Provisional Application No. 62/270,384, filed Dec. 21, 2015 and U.S. Provisional Patent Application No. 62/147,568, filed on Apr. 14, 2015. The entire contents of these applications are incorporated herein by reference.

This application is related to U.S. application Ser. No. 14/338,423, entitled "System and Method for Exchanging Data with Smart Cards," filed Jul. 23, 2014, which claims the benefit of U.S. Provisional Application No. 61/857,443, filed on Jul. 23, 2013 and U.S. application Ser. No. 15/098,935, entitled "Dynamic Transaction Card Power Management," filed Apr. 14, 2016, which claims the benefit of U.S. Provisional Application No. 62/266,324, filed Dec. 11, 2015, U.S. Provisional Application No. 62/270,307, filed Dec. 21, 2015, and U.S. Provisional Application No. 62/305,599, filed Mar. 9, 2016. The entire contents of these applications are incorporated herein by reference.

FIELD OF THE DISCLOSURE

The present disclosure relates to an optimized dynamic transaction card where various inputs optimize operational configurations and/or a user experience of the dynamic transaction card, detect system and/or device defects, and extend an energy storage life of the dynamic transaction card.

BACKGROUND OF THE DISCLOSURE

A smart card includes a variety of operational configurations, such as lighting configurations, display configurations, and sensor configurations and performs a number of functions. Each of these configurations and/or functions depletes the power components of the dynamic transaction card and may be altered in order to affect the depletion of power components. Additionally, these electronic configurations and/or functions may negatively affect a user experience and/or user behaviors associated with the card These and other drawbacks exist.

SUMMARY OF THE DISCLOSURE

Various embodiments of the present disclosure provide devices and methods relating to an optimized electronic transaction card where various data inputs associated with a dynamic transaction card optimize operational configurations and/or a user experience of the dynamic transaction card to extend an energy storage life of the dynamic transaction card, promote various behaviors, and/or detect system and/or device defects.

As referred to herein, a dynamic transaction card may include a dynamic transaction card with various configurations and/or functionality that use the power components (e.g., printed circuit board (PCB), energy storage component, battery, and/or the like) of the dynamic transaction card. The configuration and/or functionality data associated with the power components may include, for example, sensor input (e.g., a number of taps, a number of double taps, time between double taps, fingerprint, PIN or password input, light sensor threshold, and/or the like), connection data (e.g., connection attempts, connection length, time in advertising mode, time in scanning mode, and/or the like), transaction data (e.g., contactless transaction attempts, time per contactless transaction, contact transaction attempts, time per contact transactions, and/or the like), display data (e.g., light brightness, light active time, display brightness, display contrast, display active time, and/or the like), and/or the like.

The configuration and/or functionality data may be determined and/or stored by the dynamic transaction card, transmitted to a user device, stored in a user device, transmitted to a backend server, and/or stored in a backend server. The configuration and/or functionality data may be used by the dynamic transaction card, user device, and/or backend server to determine optimal configurations and/or user experiences for the dynamic transaction card and/or additional dynamic transaction cards, detect system and/or device defects, promote a particular user behavior, and/or extend an energy storage life of one or more dynamic transaction cards.

Optimal configurations may be determined by linear regression, logistic regression, ridge regression, lasso regression, Bayesian regression, machine learning algorithms, and/or the like. Optimal configurations may be determined on a device-by-device basis, a grouping of device (e.g., grouping by demographic data, grouping by geolocation data, grouping by usage, grouping by software revisions, grouping by hardware differences such as a device generation, and/or the like), and or the entirety of dynamic transaction cards. System defects may be determined by determining and detecting outlier data associated with transaction card transaction data. Device defects may be determined by determining and detecting outlier data associated with any configuration and/or functionality data for a particular device.

Extended energy storage life may be determined based on the optimal configurations. For example, the configuration and/or functionality data may be optimized in order to determine a maximum energy storage life for a dynamic transaction card, promote various behaviors, and/or detect system and/or device defects. Configuration and/or functionality data may be optimized in order to determine a maximum transaction attempts. Without the data generated by the dynamic transaction card (s), the dynamic transaction cards may not be optimized in order to determine defects, promote user behaviors, and/or optimize an energy storage life.

Transmission of data between a dynamic transaction card and a user device and/or backend system may be performed at any interval. For example, transmission of data may occur on an hourly, daily, and/or other timed interval. Transmission of data may occur on an event basis, such as a number of transactions, a number of power-ups of a dynamic transaction card, a number of waking-ups of a dynamic transaction card, and/or the like.

Optimization of data may be performed at any interval. For example, optimization of data may occur on an hourly, daily, and/or other timed interval. Optimization of data may occur on an event basis, such as a number of transactions, a number of power-ups of a dynamic transaction card, a number of waking-ups of a dynamic transaction card, and/or the like.

BRIEF DESCRIPTION OF THE DRAWINGS

Various embodiments of the present disclosure, together with further objects and advantages, may best be understood by reference to the following description taken in conjunction with the accompanying drawings, in the several Figures of which like reference numerals identify like elements, and in which.

DETAILED DESCRIPTION OF THE EMBODIMENTS

The following description is intended to convey a thorough understanding of the embodiments described by providing a number of specific example embodiments and details involving data associated with a dynamic transaction card that may be used as input to optimize operational configurations and/or a user experience of the dynamic transaction card, detect system and/or device defects, and extend an energy storage life of the dynamic transaction card. It should be appreciated, however, that the present disclosure is not limited to these specific embodiments and details, which are examples only. It is further understood that one possessing ordinary skill in the art, in light of known systems and methods, would appreciate the use of the invention for its intended purposes and benefits in any number of alternative embodiments, depending on specific design and other needs. A dynamic transaction card, mobile device, and PoS are used as examples for the disclosure. The disclosure is not intended to be limited to dynamic transaction cards, mobile devices, or PoS systems only.

Additionally, the use of "mobile device" in the examples throughout this application is only by way of example. Any type of device capable of communicating with a dynamic transaction card may also be used, including, for example, personal computers, tablets, gaming systems, televisions, or the like.

Figure 1:
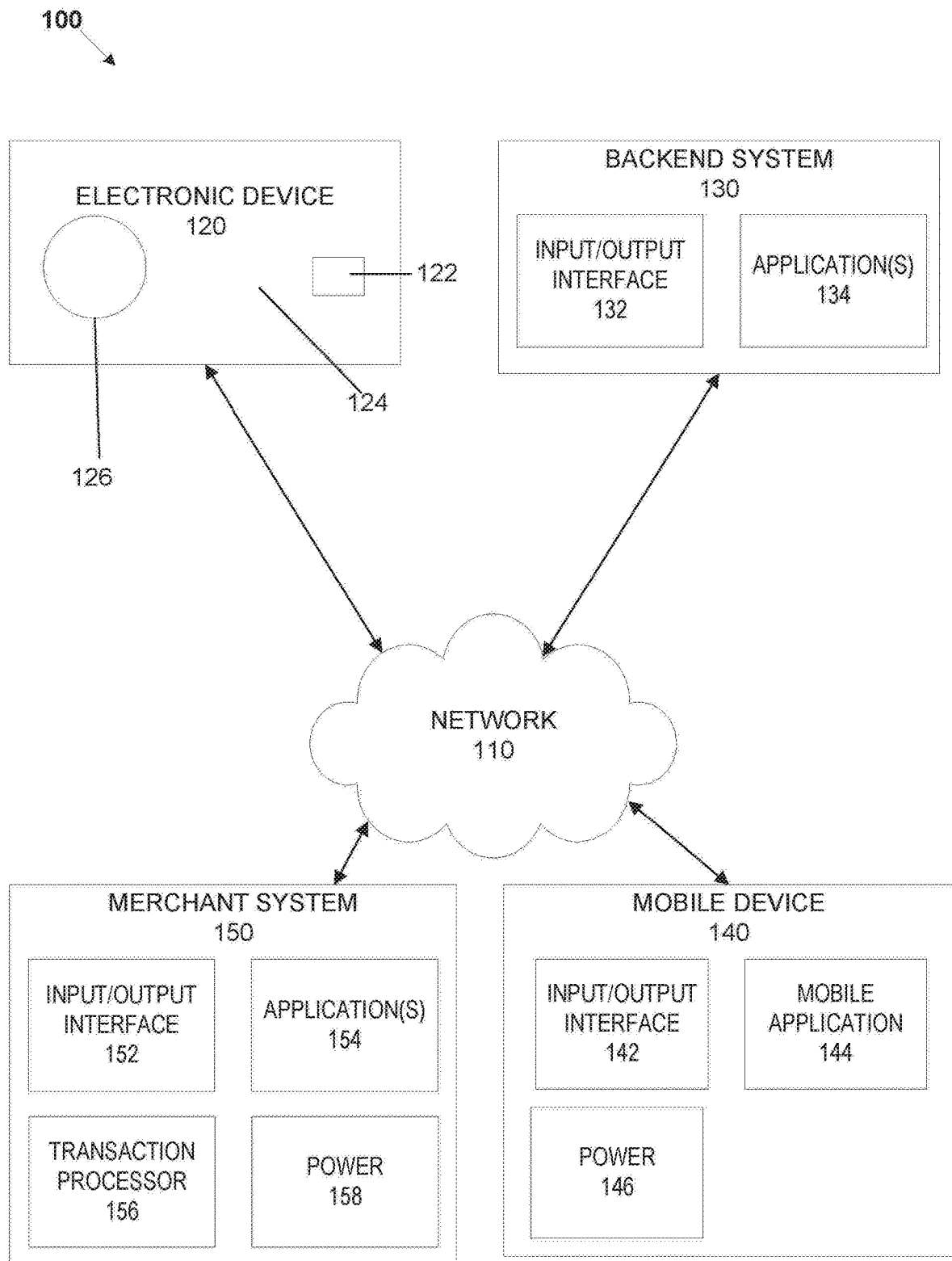
FIG. 1 depicts an example embodiment of a system that uses data associated with a dynamic transaction card as input to optimize operational configurations and/or a user experience of the dynamic transaction card, detect system and/or device defects, and extend an energy storage life of the dynamic transaction card, according to embodiments of the disclosure.

FIG. 1 depicts an example system 100 including a dynamic transaction card that generates data that may be used as input to optimize operational configurations and/or a user experience of the dynamic transaction card, detect system and/or device defects, and extend an energy storage life of the dynamic transaction card. As shown in FIG. 1, an example system 100 may include one or more dynamic transaction cards 120, one or more backend systems 130, one or more mobile devices 140, and one or more merchant systems 150 connected over one or more networks 110.

For example, network 110 may be one or more of a wireless network, a wired network or any combination of wireless network and wired network. For example, network 110 may include one or more of a fiber optics network, a passive optical network, a cable network, an Internet network, a satellite network, a wireless LAN, a Global System for Mobile Communication ("GSM"), a Personal Communication Service ("PCS"), a Personal Area Network ("PAN"), Wireless Application Protocol (WAP), Multimedia Messaging Service (MMS), Enhanced Messaging Service (EMS), Short Message Service (SMS), Time Division Multiplexing (TDM) based systems, Code Division Multiple Access (CDMA) based systems, D-AMPS, Wi-Fi, Fixed Wireless Data, IEEE 802.1.1b, 802.15.1, 802.11n and 802.11g, a Bluetooth network, or any other wired or wireless network for transmitting and receiving a data signal.

In addition, network 110 may include, without limitation, telephone lines, fiber optics, IEEE Ethernet 902.3, a wide area network ("WAN"), a local area network ("LAN"), a wireless personal area network ("WPAN"), or a global network such as the Internet. Also network 110 may support an Internet network, a wireless communication network, a cellular network, or the like, or any combination thereof. Network 110 may further include one network, or any number of the example types of networks mentioned above, operating as a stand-alone network or in cooperation with each other. Network 110 may utilize one or more protocols of one or more network elements to which they are communicatively coupled. Network 110 may translate to or from other protocols to one or more protocols of network devices. Although network 110 is depicted as a single network, it should be appreciated that according to one or more embodiments, network 110 may comprise a plurality of interconnected networks, such as, for example, the Internet, a service provider's network, a cable television network, corporate networks, and home networks.

Mobile device 140 and/or merchant system 150 may include, for example, one or more mobile devices, such as, for example, personal digital assistants (PDA), tablet computers and/or electronic readers (e.g., iPad, Kindle Fire, Playbook, Touchpad, etc.), wearable devices (e.g., Google Glass), telephony devices, smartphones, cameras, music playing devices (e.g., iPod, etc.), televisions, set-top-box devices, and the like.

Backend systems 130, mobile devices 140, and/or merchant system 150 also may include a network-enabled computer system and/or device. As referred to herein, a network-enabled computer system and/or device may include, but is not limited to: e.g., any computer device, or communications device including, e.g., a server, a network appliance, a personal computer (PC), a workstation, a mobile device, a phone, a handheld PC, a personal digital assistant (PDA), a thin client, a fat client, an Internet browser, or other device. The network-enabled computer systems may execute one or more software applications to, for example, receive data as input from an entity accessing the network-enabled computer system, process received data, transmit data over a network, and receive data over a network. For example, merchant system 150 may include, for example, components illustrated in FIG. 4.

Backend systems 130, mobile devices 140, and/or merchant system 150 may include at least one central processing unit (CPU), which may be configured to execute computer program instructions to perform various processes and methods. Backend systems 130, mobile devices 140, and/or merchant system 150 may include data storage, including for example, random access memory (RAM) and read only memory (ROM), which may be configured to access and store data and information and computer program instructions. Data storage may also include storage media or other suitable type of memory (e.g., such as, for example, RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives, any type of tangible and non-transitory storage medium), where the files that comprise an operating system, application programs including, for example, web browser application, email application and/or other applications, and data files may be stored. The data storage of the network-enabled computer systems may include electronic information, files, and documents stored in various ways, including, for example, a flat file, indexed file, hierarchical database, relational database, such as a database created and maintained with software from, for example, Oracle® Corporation, Microsoft® Excel file, Microsoft® Access file, a solid state storage device, which may include an all flash array, a hybrid array, or a server-side product, enterprise storage, which may include online or cloud storage, or any other storage mechanism.

Backend systems 130, mobile devices 140, and/or merchant system 150 may further include, for example, a processor, which may be several processors, a single processor, or a single device having multiple processors. Although depicted as single elements, it should be appreciated that according to one or more embodiments, backend systems 130, mobile devices 140, and/or merchant system 150 may comprise a plurality of backend systems 130, mobile devices 140, and/or merchant systems 150.

Backend systems 130, mobile devices 140, and/or merchant system 150 may further include data storage. The data storage may include electronic information, files, and documents stored in various ways, including, for example, a flat file, indexed file, hierarchical database, relational database, such as a database created and maintained with software from, for example, Oracle® Corporation, Microsoft® Excel file, Microsoft® Access file, a solid state storage device, which may include an all flash array, a hybrid array, or a server-side product, enterprise storage, which may include online or cloud storage or any other storage mechanism.

As shown in FIG. 1, each backend systems 130, mobile devices 140, and/or merchant system 150 may include various components. These components may be understood to refer to computer executable software, firmware, hardware, and/or various combinations thereof. It is noted that where a component includes software and/or firmware, the components is configured to affect the hardware elements of an associated system. It is further noted that the components shown and described herein are intended as examples. The components may be combined, integrated, separated, or duplicated to support various applications. Also, a function described herein as being performed at a particular component may be performed at one or more other components and by one or more other devices instead of or in addition to the function performed at the particular component.

As depicted in FIG. 1, system 100 may include a dynamic transaction card 120. A dynamic transaction card 120 may include an electronic display to display alerts, notifications, and/or other output via a display and/or LED lighting 126 and/or receive input to interact with the electronic device 120 via, for example, a sensor 124. Dynamic transaction card 120 also may be composed of various materials that enable the entire exterior surface of dynamic transaction card 120 to act as a sensor.

A dynamic transaction card 120 may be able to communicate with, for example, a mobile device using RFID, Bluetooth, NFC, WiFi Direct, and/or other related technologies. For example, communications between a dynamic transaction card 120 and a mobile device 140 may include methods, systems, and devices as described in U.S. patent application Ser. No. 14/338,423 filed on Jul. 23, 2014, the entire contents of which is incorporated herein by reference.

Figure 2:
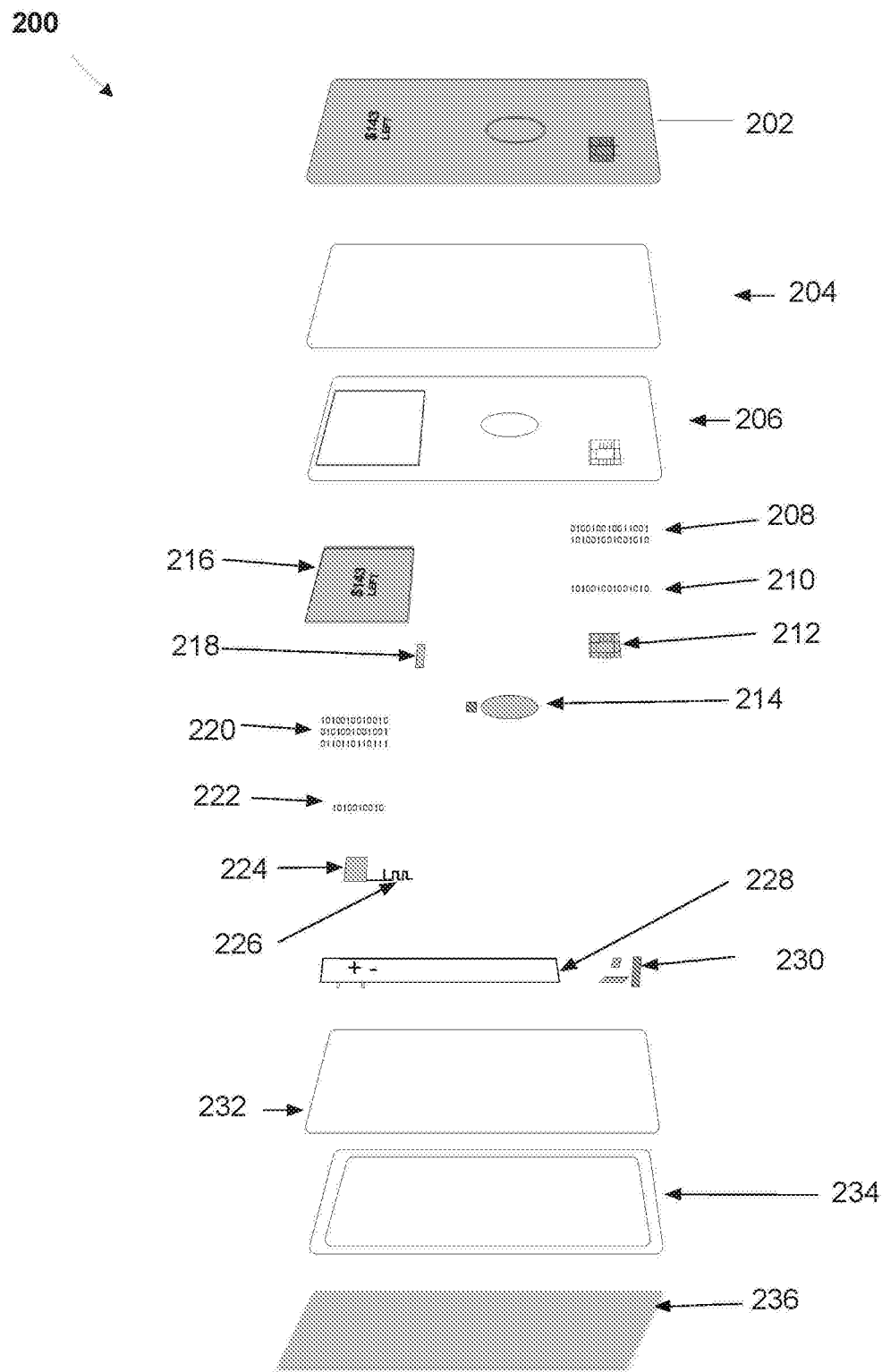
FIG. 2 depicts an example embodiment of a dynamic transaction card that creates, monitors, and/or transmits data associated with the dynamic transaction card as input to optimize operational configurations and/or a user experience of the dynamic transaction card, detect system and/or device defects, and extend an energy storage life of the dynamic transaction card, according to embodiments of the disclosure.
Figure 3:
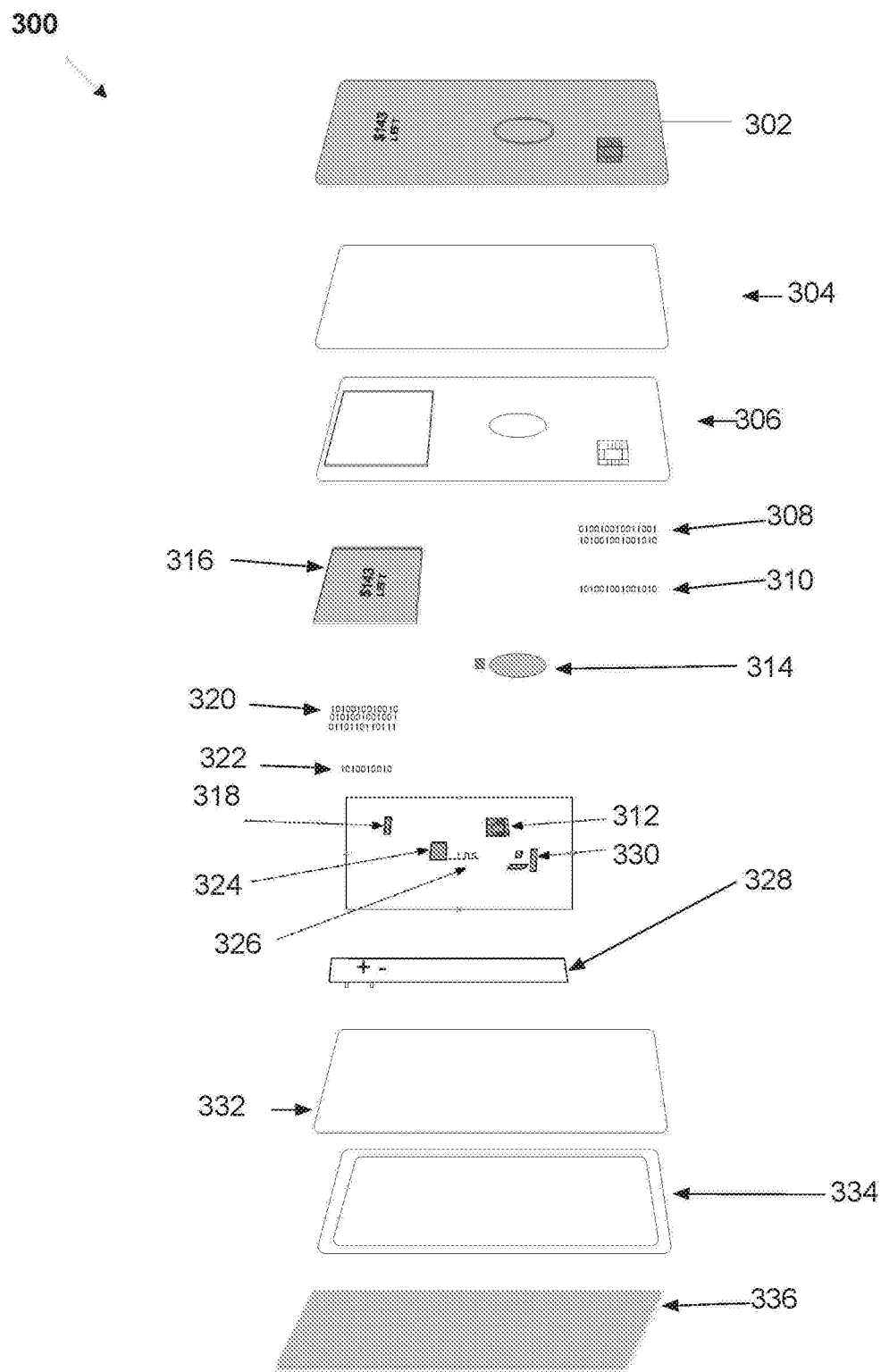
FIG. 3 depicts an example embodiment of a dynamic transaction card that creates, monitors, and/or transmits data associated with the dynamic transaction card as input to optimize operational configurations and/or a user experience of the dynamic transaction card, detect system and/or device defects, and extend an energy storage life of the dynamic transaction card, according to embodiments of the disclosure.

A dynamic transaction card 120 may be able to communicate with a merchant system 150 via contacts 122 (e.g., EMV chip contacts) located on the dynamic transaction card 120. A dynamic transaction card 120 may also include hardware components to provide contactless payments and/or communications. For example, a dynamic transaction card 120 may include an output layer, an outer protective layer, potting, application (e.g., a Java Applet), application integration (e.g., Java Applet integration), an EMV chip 122, one or more sensors, a display, a display driver, firmware, a bootloader, a microcontroller, one or more antenna, an energy storage component, power management, a flexible PCB, a chassis, and/or card backing as illustrated in FIGS. 2 and 3. An EMV chip 122 may be embedded in the electronic device 120 may include a number of contacts that may be connected and activated using an interface device.

FIG. 2 depicts an example dynamic transaction card 200. As shown in FIG. 2, dynamic transaction card 200 may include a top output layer 202. The top output layer may be a film covering, a plastic covering, and/or the like. The top output layer 202 may be constructed of scratch-resistant and/or scratch-proof materials. Materials that may be used as a top outer layer 202 may include polyvinyl chloride (PVC), polylactic acid (PLA), acrylonitrile butadiene styrene (ABS), polyethylene terephthalate (PET), Polyethylene terephthalate glycol-modified (PET-G), and/or the like. A dynamic transaction card 200 may further include a top protective layer 204, such as a clear scratch-resistant coating and/or scratch-proof material to protect the underlying components. For example, various scratch-resistant materials include materials coated with a scratch resistant chemical coating, such as a UV curable chemical coating. Scratch-proof materials may include a mineral glass, a sapphire glass material, PVC, PET, and/or PET-G.

A dynamic transaction card may include a potting 206 or filler epoxy around the electrical components to provide strength and/or water resistance. A potting 206 may include a light guide, which may be constructed of optical grade materials such as acrylic, resin, polycarbonate, epoxies, and/or glass. Potting 206 may also include injection molding, such as over molding and/or multi-shot to encapsulate the internal components of card 200. For example, injection molding may include ABS, thermoplastic elastomers (TPE), thermoplastic vulcanizate (TPV), thermoplastic polyurethane (TPU), PET, ploycarbonates (PC), and/or silicone.

A dynamic transaction card 200 may further include a Java Applet 208 and Java Applet integration 210. Although a Java Applet 208 is used through the specification, any other similar type of code application may be used. Moreover, although Java Applet integration 210 is used throughout this specification, any type of interface may be used to allow the microcontroller to interact with the EMV chip. A Java Applet 208 may include code that executes payments, such as payment made using an EMV chip. A Java Applet 208 may include account-provider specific code to execute display functionality specific to the account provider. Java Applet integration 210 may include coded interfaces to allow the microcontroller to interact with the EMV chip 212.

An EMV chip 212 may include a number of contacts that may interact with a terminal, such as a merchant system 150. During an EMV interaction, application cryptograms may be used to send and receive data packets between the dynamic transaction card 200 and a terminal. For example, data packets may include user authentication information which an acquisition system and/or issuing financial institution may use to authenticate a transaction card 200 during a transaction. Various cryptographic protocols and/or methods may be used in this data transmission and reception process. Moreover, during a transaction issuing financial institutions and/or acquisition systems may return script commands to the EMV chip 212 via a terminal. These script commands and/or data packets may be transmitted between parties over a network. Script commands may be used, for example, to block transactions, change transaction data stored on the EMV chip (e.g., transaction history, account limits, account balance, and/or the like). Offline data authentication may also take place using, for example public key cryptography to perform payment data authentication. For example, offline data authentication may use Static Data Authentication (SDA), Dynamic Data Authentication (DDA), and/or Combined Data Authentication (CDA).

Dynamic transaction card 200 may also include one or more sensors 214 to receive input. Sensors 214 may include an activation sensor and/or an operation sensor, which may be combined and/or separate. An activation sensor may activate the dynamic transaction card 200 and an operation sensor may instruct the dynamic transaction card 200 to perform an action based on the received input. An activation sensor may require a security input, such as a biometric input (e.g., fingerprint, eye scan, voice recognition, and/or the like), input indicative of paired mobile device (e.g., BLE and/or Bluetooth pairing), input indicative of a password (e.g., a password received via a sensor on the dynamic transaction card and/or a password received on a paired mobile device), and/or the like. An operation sensor may change a display 216 based on received input, conduct a transaction via, for example an EMV chip 212 and/or contactless payment technologies based on received input, attempt a pairing of a card 200 and a mobile device, and/or the like.

By way of example, a sensor 214 may include a capacitive touch sensor, a piezoelectric sensor, load cells, a light sensor, a temperature sensor, a resistive touchscreen, including for example an analogue matrix real (AMR) sensors, and/or the like. Sensors 214 may include accelerometers to detect motion input.

Although the sensor 214 is depicted at a particular spot in the transaction card 200, a sensor 214 may be placed at any portion of the card to detect, for example, touch, light, heat, energy, and/or the like. For example, a sensor may be placed around the outer edges of a dynamic transaction card 200 or at any spot within the dynamic transaction card 200. Sensor 214 also may include the entire exterior surface of transaction card 200.

A display 216 may be provided within the transaction card 200. Although the display as shown includes, for example, a dot matrix display, a number of other display options may be included in the transaction card 200. For example, lighting, such as LED lighting, OLED lighting, and/or the like, may be used as display components. Display components may also include electronic paper, Mirasol, TF LCD, Quantum Dot Display, and/or the like. Where lighting is used, various lighting technologies may be used to create a display that indicates a number of things to a cardholder. For example, edge lighting may be used to create a specific visual component in the display. A number of LED or OLED lights may be used to illuminate various portions of the display in order to output information to a card holder.

By way of example, a display 216 may be illuminated using a particular color to relay to the cardholder balance information of an account associated with a transaction card, such as an RGB LED matrix panel and/or RGB LED displays. A red light display may indicate that the account balance is within a first predetermined dollar amount or a first predetermined percentage of the total spending limit, a particular budget, a particular budget category, and/or the like. A yellow light display may indicate that the account balance is within a second predetermined dollar amount or a second predetermined percentage of the total spending limit, a particular budget, a particular budget category, and/or the like. A green light display may indicate that the account balance is within a third predetermined dollar amount or a third predetermined percentage of the total spending limit, a particular budget, a particular budget category, and/or the like. Various colors and or number of categories may be used to output this information to a cardholder. A display 216 may include other display component, such as, for example, LCD technology, ePaper technology (e.g., e-ink), vacuum florescent display technology, and/or the like.

By way of example, a display may include a number of LED or OLED lights that may be lit in a particular pattern to indicate transaction and/or account information. For example, a display may include a circle, semicircle, or other shape of LED or OLED lighting, where the number of lights illuminated indicates a dollar amount or a percentage of the total spending limit, a particular budget, a particular budget category, and/or the like.

A display may be altered and/or modified, for example, for example, where dynamic transaction card 200 includes a debit account, a first credit account, and a second credit account, display components 216 may reflect the card number, security code, expiration date, and/or other necessary data indicative of the account (e.g., second credit account)

that is being used to execute a transaction. A display may be altered and/or modified when, for example, a dynamic transaction card 200 receives new card data and/or new account data from an account holder's mobile device via a wireless connection. For example, where an account has been marked as associated with fraudulent activity, an account holder and/or issuing financial institution may deactivate the card associated with the account and issue a new card. Accordingly, new card data may be transmitted from the issuing financial institution to, for example, an account holder's mobile device via a network, and then from an account holder's mobile device to electronic card 200 via a wireless connection. A display may also be altered and/or modified when electronic card 200 activates a new account. For example, when an account holder applies for a new account (e.g., a new credit card account, a new checking account, and/or the like), if approved, new account data may be transmitted to electronic card 200. New account data may be received at an account holder's mobile device from an issuing financial institution via a network (e.g., using a mobile application, mobile optimized website, and/or the like). New account data may then be transmitted from an account holder's mobile device to electronic card 200 via a wireless connection (e.g., BLE, RFID, NFC, WiFi, and/or the like) or a contact connection (e.g., using a terminal in contact with an EMV chip and/or other microchip).

A dynamic transaction card 200 may include a display driver 218 that translates instructions from a microcontroller 224 into display images to be displayed using display components 216. A display driver 218 may include an integrated circuit (IC), a state machine, and/or the like that provides an interface function between the display and the microcontroller 224. A display driver 218 may include memory (e.g., RAM, Flash, ROM, and/or the like) and/or firmware that includes font display data.

A dynamic transaction card 200 may include firmware 220 and/or a bootloader 222. A bootloader 222 may include code to be executed as an electronic card 200 is activated and before any operating system, firmware, or other code is executed on the dynamic transaction card 200. A bootloader may be activated via a sensor 214 and energy storage component 228 of the dynamic transaction card 200. Bootloader 222 may be activated and/or load an application and/or program upon detection that card 200 has been inserted into a terminal, charger, and/or the like. Bootloader 222 may be activated using only one technique described herein, using multiple techniques described herein, and/or using a card holder or card provider selected technique(s) described herein. Bootloader 222 may only be active during a short interval after the card 200 powers up. Card 200 may also be activated using program code that may be flashed directly to a microprocessor such as microcontroller 224, EMV chip 212, and/or the like. Card 200 may not use a bootloader 222 but instead may cycle between a sleep state and an active state using program code and/or memory.

A dynamic transaction card 200 may include a microcontroller 224 and an antenna 226. Antenna 226 may include, for example, a loop antenna, a fractal antenna, and/or the like. Antenna 226 may transmit to and receive signals from a mobile device, such as mobile device 140, to conduct transactions and display data as described throughout the specification. Microcontroller 224 may communicate with EMV chip 212, Java Applet 208, Java Applet integration 210, sensor(s) 214, power management 230, antenna 226, energy storage component 228, display 216, display driver 218, firmware 220, bootloader 222, and/or any other component of dynamic transaction card 200. Microcontroller 224 may control the card operations to conduct transactions and/or display data as described throughout this specification. Microcontroller 224 may control data collection and/or instruct data storage and/or transmission associated with the methods described herein.

Dynamic transaction card 200 may include an energy storage component 228 that is integrated in a PCB 232. By way of example, energy storage component 228 may include a lithium polymer battery, a lithium-metal battery, lithium-ceramic battery, and/or any other type of battery, and/or power source. Energy storage component 228 may be constructed out of rigid materials, semiflexible materials, and/or flexible materials. Energy storage component 228 may provide power to card components contained within dynamic transaction card 200. Energy storage component 228 may be a combine battery/potting component to support dynamic transaction card 200.

Dynamic transaction card 200 may include a power management component 230 that may manage the charging and discharging of energy storage component 228. Power management component 230 may convert voltage to a predetermined level in order to operate dynamic transaction card 200 as discussed throughout the specification. Power management component 230 and/or energy storage component 228 may include, for example, solar power cells to convert solar energy into an electrical current within a solar panel. Power management component 230 and/or energy storage component 228 may include connections to sensors 214 to receive input and activate dynamic transaction card 200 (e.g., motion input, thermal input, manual input, touch input, and/or the like).

A flexible printed circuit board (PCB) 232 may be included in dynamic transaction card 200. A flexible PCB 232 may include a PCB mounted in a flexible plastic substrate, such as for example, a polyimide, polyether ether ketone, and/or a transparent conductive polyester film. A flexible PCB 232 may be printed, using, for example screen printing, 3D printing, and/or the like, to arrange circuits on a material, such as polyester. Flexible PCB 232 may include electronic components and connections that power dynamic transaction card 200. Flexible PCB 232 may control and/or provide integration between the components of card 200. For example, flexible PCB 232 mechanically supports and electronically connects the electronic components of card 200 using, for example, conductive tracks, pads, and/or other features. A flexible printed circuit (FPC) may be used in place of or in conjunction with flexible PCB 232. FPC 232 may be fabricated with photolithographic technology, such as light exposure of a film material laminated to substrate and/or conductive layers. FPC 232 may be printed, silk-screened, and/or the like. FPC 232 may be used as a structural member for the electronic components of card 200 and/or for the card system as a whole 200.

Dynamic transaction card 200 may include a chassis 234 as a frame or supporting structure. Chassis 234 may be a mount for a flexible PCB 232 and may be constructed out of flexible or semi-flexible material as well. Chassis 234 may be constructed out of a number of materials, including but not limited to, styrene, polycarbonate, polyester and PET. Chassis 234 may be constructed out of a conductive material. Chassis 234 may increase the rigidity of dynamic transaction card 200 to prevent damage. Chassis 234 may also be used to detect if dynamic transaction card 200 is being held by including sensors 214 around chassis 234. Where chassis 234 is constructed out of a conductive material, a dielectric constant of chassis 234 and/or card 200 may be monitored to detect handling of card 200. Chassis 234 may be included within or separate from a card backing 236. Card backing 236 may include a magnetic stripe that may be read using a magnetic stripe reader. A magnetic strip may store tracks of data that are used to conduct a transaction using a dynamic transaction card 200. The tracks of data may include a first track capable of storing alphanumeric characters as well as symbols (e.g., ?, !, &, #, and/or the like), such as account numbers, account holder name, expiration data, security data, and/or other account and/or card related data. The tracks of data may include a second track capable of storing numeric characters such as account numbers, expiration data, security data, and/or other account and/or card related data. The tracks of data may include a third track of data capable of storing numeric characters such as an account number, a PIN, a country code, a currency code, an authorization amount, a balance amount, and/or other account and/or card related data.

A magnetic stripe may be dynamically altered. For example, a dynamic transaction card 200 that is paired to a mobile device via, for example, Bluetooth, BLE, RFID, and/or other wireless technologies, may receive new track data. The new track data may be unformatted, encrypted, encoded, and/or the like when the new track data is transmitted from the mobile device to the dynamic transaction card 200. Upon receipt of the new track data, the new track data may be routed to a microprocessor, such as EMV chip 212 and/or microcontroller 224. EIv1V chip 212 and/or microcontroller 224 may convert, decrypt, and/or decode the received new track data to ensure compliance with any standards. Once decrypted, decoded, and/or formatted, the new track data may be save on the tracks of the magnetic stripe. The magnetic stripe may be deleted and then the new track data may be recorded onto the tracks. In this manner, track data stored on a magnetic stripe may be altered at any time upon pairing a dynamic transaction card 200 with a mobile device.

Card backing 236 may be made of similar material to that of the output layer 202 and/or the top protective layer 204. Card backing 236 may be made out of a plastic material.

Although the components of dynamic transaction card 200 are illustrated in a particular fashion, these components may be combined and or placed throughout a dynamic transaction card 200 in any manner, such as those depicted in, for example, FIG. 3.

For example, FIG. 3 illustrates an electric transaction card having an output layer 302 which may be similar to output layer 202; an outer protective layer 304 which may be similar to outer protective layer 204; potting 306 which may be similar to potting 206; Java Applets 308 which may be similar to Java Applets 208; Java Applet integration 310 which may be similar to Java Applet integration 210; an EMV chip 312 which may be similar to EMV chip 212; a sensor 314 which may be similar to sensor 214; display 316 which may be similar to display 216; display driver 318 which may be similar to display driver 218; firmware 320 which may be similar to firmware 220; bootloader 322 which may be similar to bootloader 222; microcontroller 324 which may be similar to microcontroller 224; antenna 326 which may be similar to antenna 226; energy storage component 328 which may be similar to energy storage component 228; power management 330 which may be similar to power management 230; a flexible PCB 332 which may be similar to flexible PCB 232; chassis 334 which may be similar to chassis 234; and/or card backing 336 which may be similar to card backing 236.

Returning to FIG. 1, backend system 130 may include a backend system that communicates with dynamic transaction card 120. For example, where dynamic transaction card 120 is associated with a transaction card, backend system 130 may be a system associated with, for example, a banking service company such as Capital One®, Bank of America®, Citibank®, Wells Fargo®, Sun Trust, various community banks, and the like, as well as a number of other financial institutions such as Visa®, MasterCard®, and American Express® that issue credit and/or debit cards, for example, as transaction cards. In this example, backend system 130 may include and/or be connected to one or more computer systems and networks to process transactions.

Where an electronic device 120 is associated with a dynamic transaction card, backend system 1.30 may include systems associated with financial institutions that issue transaction cards and maintains a contract with cardholders for repayment. In various embodiments, a backend system 130 may issue a dynamic transaction card. Backend 130 may include, by way of example and not limitation, depository institutions (e.g., banks, credit unions, building societies, trust companies, mortgage loan companies, pre-paid gift cards or credit cards, etc.), contractual institutions (e.g., insurance companies, pension funds, mutual funds, etc.), investment institutions (e.g., investment banks, underwriters, brokerage funds, etc.), electronics companies (e.g., electronics manufacturers, software providers, etc.), and other non-bank financial institutions (e.g., pawn shops or brokers, cashier's check issuers, insurance firms, check-cashing locations, payday lending, currency exchanges, microloan organizations, crowd-funding or crowd-sourcing entities, third-party payment processors, etc.).

Backend system 130 may include, among other components, an input/output interface 132 and various applications 134 that run the hardware included in backend system 130. Input/output interface 132 may include for example, I/O devices, which may be configured to provide input and/or output to/from backend system 130 (e.g., keyboard, mouse, display, speakers, printers, modems, network cards, etc.). Input/output interface 132 also may include antennas, network interfaces that may provide or enable wireless and/or wire line digital and/or analog interface to one or more networks, such as network 110, over one or more network connections, a power source that provides an appropriate alternating current (AC) or direct current (DC) to power one or more components of backend system 130, and a bus that allows communication among the various components of backend system 130. Input/output interface 132 may include a display, which may include for example output devices, such as a printer, display screen (e.g., monitor, television, and the like), speakers, projector, and the like. Although not shown, each backend system 130 may include one or more encoders and/or decoders, one or more interleavers, one or more circular buffers, one or more multiplexers and/or de-multiplexers, one or more permuters and/or depermuters, one or more encryption and/or decryption units, one or more modulation and/or demodulation units, one or more arithmetic logic units and/or their constituent parts, and the like.

Applications 134 may include various hardware and software components to communicate between an electronic device 120, merchant system 150, and/or mobile device 140 in order to send/receive data and execute functionality associate with electronic device 120. For example, where electronic device 120 is a dynamic transaction card, applications 134 may be used to process a transaction using the dynamic transaction card. Backend system 130 may also include various hardware and software components, such as data storage (not shown) to store data associated with an electronic device 120. For example, when an electronic device 120 is a dynamic transaction card, backend system 130 may store a card number, account type, account balance, account limits, budget data, recent transactions, pairing data such as time and date of pairing with a mobile device, and the like and/or cardholder data such as a cardholder name, address, phone number(s), email address, demographic data, and the like.

Figure 6:
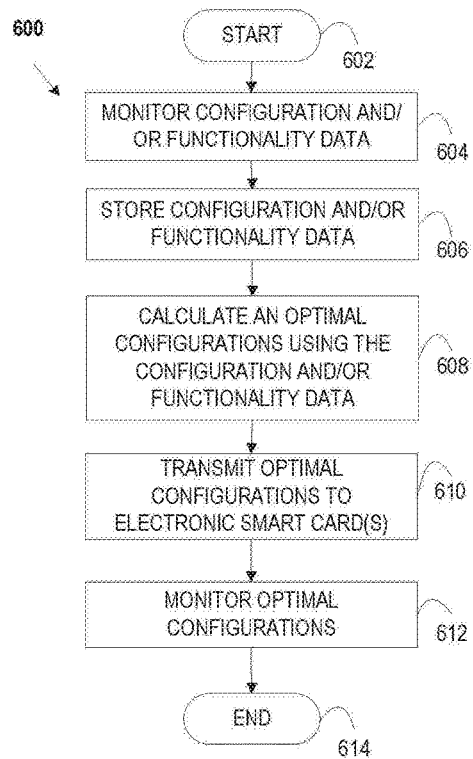
FIG. 6 depicts an example method that uses data associated with a dynamic transaction card as input to optimize operational configurations and/or a user experience of the dynamic transaction card, detect system and/or device defects, and extend an energy storage life of the dynamic transaction card, according to embodiments of the disclosure.
Figure 7:
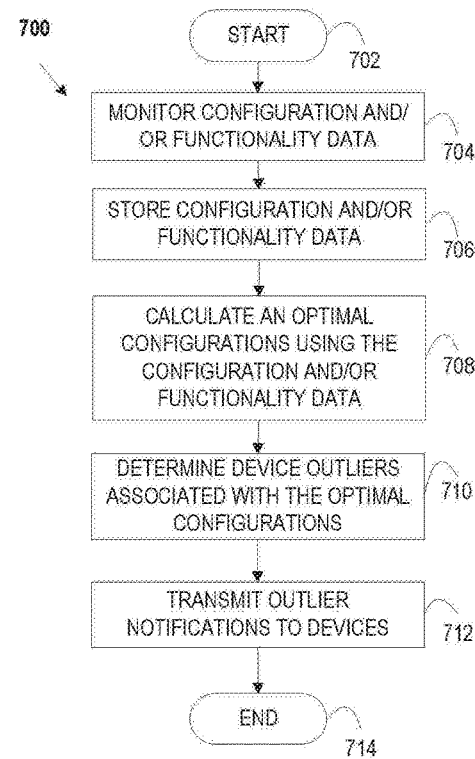
FIG. 7 depicts an example method that uses data associated with a dynamic transaction card as input to optimize operational configurations and/or a user experience of the dynamic transaction card, detect system and/or device defects, and extend an energy storage life of the dynamic transaction card, according to embodiments of the disclosure.

Applications 134 may include various hardware and software components to use data associated with a dynamic transaction card 120 as input to optimize operational configurations and/or a user experience of the dynamic transaction card, detect system and/or device defects, and extend an energy storage life of the dynamic transaction card as described herein, for example in FIGS. 6 and 7.

A mobile device 140 may be any device capable of communicating with a dynamic transaction card 120 via, for example, Bluetooth technology, NFC technology, WiFi Direct technology, and/or the like. For example, mobile device 140 could be an iPhone, iPod, iPad, and/or Apple Watch from Apple® or any other mobile device running Apple's iOS operating system, any device running Google's Android® operating system, including, for example, smartphones running the Android® operating system and other wearable mobile devices, such as Google Glass or Samsung Galaxy Gear Smartwatch, any device running Microsoft's Windows® Mobile operating system, and/or any other smartphone or like device.

Mobile device 140 may include for example, an input/output interface 142, a mobile application 144, and a power component 1.46. Input/output interface 142 may include, for example, a Bluetooth, RFID, and/or NFC interface or chipset with a Bluetooth/RFID/NFC transceiver, a chip, and an antenna. The transceiver may transmit and receive information via the antenna and an interface. The chip may include a microprocessor that stores and processes information specific to a transaction card device and provides device control functionality. Device control functionality may include connection creation, frequency-hopping sequence selection and timing, power control, security control, polling, packet processing, and the like. The device control functionality and other Bluetooth/RFID/NFC-related functionality may be supported using a Bluetooth/RFID/NFC API provided by the platform associated with the mobile device 140 (e.g., The Android platform, the iOS platform). Using a Bluetooth/RFID/NFC API, an application stored on a mobile device 140 (e.g., a banking application, a financial account application, etc.) or the device may be able to scan for other Bluetooth/RFID/NFC devices (e.g., a dynamic transaction card 120), query the local Bluetooth/RFID/NFC adapter for paired Bluetooth/RFID/NFC devices, establish RFCOMM channels, connect to other devices through service discovery, transfer data to and from other devices (e.g., electronic device 120) and manage multiple connections. A Bluetooth API used in the methods, systems, and devices described herein may include an API for Bluetooth Low Energy (BLE) to provide significantly lower power consumption and allow a mobile device 140 to communicate with BLE devices that have low power requirements, such dynamic transaction card 120.

Input/output interface 142 may include for example, I/O devices, which may be configured to provide input and/or output to mobile device 140 (e.g., keyboard, mouse, display, speakers, printers, modems, network cards, etc.). Input/output interface 142 also may include antennas, network interfaces that may provide or enable wireless and/or wire line digital and/or analog interface to one or more networks, such as network 110, over one or more network connections, a power source that provides an appropriate alternating current (AC) or direct current (DC) to power one or more components of mobile device 140, and a bus that allows communication among the various components of mobile device 140. Input/output interface 142 may include a display, which may include for example output devices, such as a printer, display screen (e.g., monitor, television, and the like), speakers, projector, and the like. Although not shown, each mobile device 140 may include one or more encoders and/or decoders, one or more interleavers, one or more circular buffers, one or more multiplexers and/or de-multiplexers, one or more permuters and/or depermuters, one or more encryption and/or decryption units, one or more modulation and/or demodulation units, one or more arithmetic logic units and/or their constituent parts, and the like.

Input/output interface 142 may also include an NFC antenna and secure element (SE). The SE may be a hardware chip specially designed to be tamper proof. In one embodiment, the SE may be used for digitally and physically secure storage of sensitive data. For example, SE may be used to store transaction card data, payment data, health records, car key identifiers, etc. The SE may, for example, store information related to a person, customer, financial institution, or other entity. The SE may store information related to a financial account, such as, for example, transaction card data (e.g., a credit card number, debit account number, or other account identifier, account balance, transaction history, account limits, budget data, recent transactions, and/or the like). The SE may include a computer processor or other computational hardware or software. As one example, the secure element may contain the Visa® and MasterCard® applications for PayWave® and PayPass® transactions. A secure element may take the form of a universal integrated circuit card (UICC) and/or a microSD card. A UICC may identify a user to a wireless operator, store contacts, enable secure connections, and add new applications and services, such as a transaction engine that may include various components. These components may be understood to refer to computer executable software, firmware, hardware, and/or various combinations thereof.

Input/output interface 142 may enable Industry Standard NFC Payment Transmission. For example, the input/output interface 142 may enable two loop antennas to form an air-core transformer when placed near one another by using magnetic induction. Input/output interface 142 may operate at 13.56 MHz or any other acceptable frequency. Also, input/output interface 142 may provide for a passive communication mode, where the initiator device provides a carrier field, permitting answers by the target device via modulation of existing fields. Additionally, input/output interface 142 also may provide for an active communication mode by allowing alternate field generation by the initiator and target devices.

Input/output interface 142 may deactivate the RF field while awaiting data. The attachment may use Miller-type coding with varying modulations, including 100% modulation. The attachment may also use Manchester coding with varying modulations, including a modulation ratio of 1.0%. Additionally, the attachment may be capable of receiving and transmitting data at the same time, as well as checking for potential collisions when the transmitted signal and received signal frequencies differ.

Input/output interface 142 may be capable of utilizing standardized transmission protocols, for example but not by way of limitation, ISO/IEC 14443 A/B, ISO/IEC 18092, MiFare, FeliCa, tag/smartcard emulation, and the like. Also, input/output interface 142 may be able to utilize transmission protocols and methods that are developed in the future using other frequencies or modes of transmission. Input/output interface 142 may also be backwards-compatible with existing techniques, for example RFID. Also, the system may support transmission requirements to meet new and evolving standards including internet based transmission triggered by NFC.

Mobile applications 144 may include software and hardware components that work with input/output interface 142 to generate and receive account data associated with a dynamic transaction card 120. For example, applications 144 may include various hardware and software components such as a processor and data storage to store data associated with dynamic transaction card 120. For example, data may include a cardholder name, address, phone number(s), email address, demographic data, card number, account type, account balance, account limits, budget data, recent transactions and the like.

Applications 144 may also facilitate the operation of mobile device 140. For example, mobile device 140 may include an operating system such as, for example, the iOS operating system from Apple, the Google Android operating system, and the Windows Mobile operating system from Microsoft. Mobile device 1.40 may also include, without limitation, software applications 144 such as mobile banking applications or financial institution applications to facilitate use of a dynamic transaction card 120, an NFC application programming interface, and software to enable touch sensitive displays. Applications 144 may include software stacks or Application Programming Interfaces (APIs) which allow software applications to be written on top of the software stacks. For example, mobile device manufacturers may provide, without limitation, a card emulation API to enable NFC card emulation mode, a logic link control protocol (LLCP) API for peer-to-peer communication between mobile devices, a Bluetooth API supporting BLE, and a real-time data (RTD) API and a NFC Data Exchange Format (NDEF) API for reading/writing.

Applications 1.44 on mobile device 140, such as mobile banking applications and applications associated with dynamic transaction card 120, may include on/off features that allow a user associated with a mobile device 140 to enable and disable a dynamic transaction card 120. For example, where electronic device 120 is a dynamic transaction card, a card holder may use, for example, a mobile banking application stored on a mobile device 140 to disable and/or enable accounts associated with a dynamic transaction card 120.

Applications 144 may include various hardware and software components to use data associated with a dynamic transaction card 120 as input to optimize operational configurations and/or a user experience of the dynamic transaction card, detect system and/or device defects, and extend an energy storage life of the dynamic transaction card as described herein, for example in FIGS. 6 and 7.

Merchant system 150 may include, among other components, an input/output interface 152, application(s) 154, a transaction processor 156, and a power component 158. Merchant system 150 may also include data storage (not shown) to store data associated with the dynamic transaction card 120.

An input/output interface 152 may include, for example, a transceiver, modems, network interfaces, buses, CD-ROM, keyboard, mouse, microphone, camera, touch screen, printers, USB flash drives, speakers, and/or any other device configured to receive and transmit electronic data. Input/output interface 152 may include for example, I/O devices, which may be configured to provide input and/or output to and/or from merchant system 150 (e.g., keyboard, mouse, display, speakers, printers, modems, network cards, etc.). Input/output interface 152 also may include antennas, network interfaces that may provide or enable wireless and/or wire line digital and/or analog interface to one or more networks, such as network 110, over one or more network connections, a power source that provides an appropriate alternating current (AC) or direct current (DC) to power one or more components of merchant system 150, and a bus that allows communication among the various components of merchant system 150. Input/output interface 152 may include a display, which may include for example output devices, such as a printer, display screen (e.g., monitor, television, and the like), speakers, projector, and the like. Although not shown, merchant system 150 may include one or more encoders and/or decoders, one or more interleavers, one or more circular buffers, one or more multiplexers and/or de-multiplexers, one or more permuters and/or depermuters, one or more encryption and/or decryption units, one or more modulation and/or demodulation units, one or more arithmetic logic units and/or their constituent parts, and the like.

Applications 154 may include various software and/or hardware component to enable merchant system 150 to charge and/or interact with a dynamic transaction card 120 (e.g., Bluetooth, RFID, NFC, etc.). Transaction processor 156 may include a slot or connection port (not shown) to enable the merchant system 150 to connect to dynamic transaction card 120 (e.g., via contacts 122).

Merchant system 150 may also include a power component 158. Power component 158 may include a microcontroller or integrated circuit that governs power functions of merchant system 150. Power component 158 may include a power source (e.g., a main battery or energy storage component as described herein). Power component 158 also may include, for example, firmware, software, memory, a CPU, a CPU, input/output functions, timers to measure intervals of time, as well as analog to digital converters to measure the voltages of the main battery or energy storage component of merchant system 150. In various embodiments, power component 158 remain active even when merchant system 150 is completely shut down, unused, and/or powered by the backup battery or energy storage component. Power component 158 may be responsible for coordinating many functions, including, for example, monitoring power connections and battery or energy storage component charges, charging batteries when necessary, controlling power to other integrated circuits within merchant system 150 and/or other peripherals and/or readers, shutting down unnecessary system components when they are left idle, controlling sleep and power functions (on and off), managing the interface for built-in keypad and trackpads, and/or regulating a real-time clock (RTC).

Figure 4:
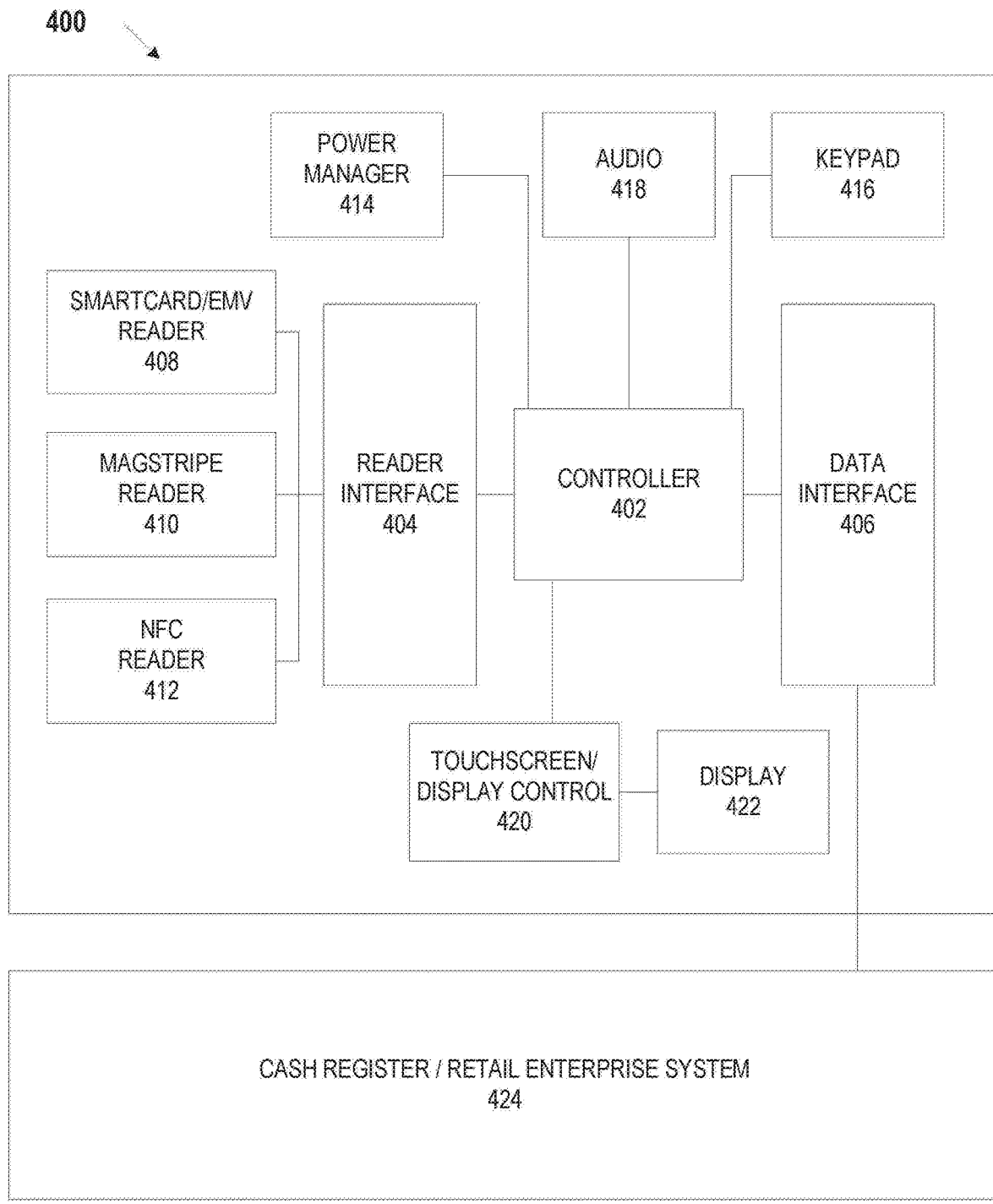
FIG. 4 depicts an example PoS system that may interact with a dynamic transaction card that creates, monitors, and/or transmits data associated with the dynamic transaction card as input to optimize operational configurations and/or a user experience of the dynamic transaction card, detect system and/or device defects, and extend an energy storage life of the dynamic transaction card, according to embodiments of the disclosure.

FIG. 4 depicts an example PoS device 400 as a merchant system, which may be similar to merchant system 150. PoS device 400 may provide the interface at what a card holder makes a payment to the merchant in exchange for goods or services. PoS device 400 may include and/or cooperate with weighing scales, scanners, electronic and manual cash registers, electronic funds transfer at point of sale (EFTPOS) terminals, touch screens and any other wide variety of hardware and software available for use with PoS device 400. PoS device 400 may be a retail point of sale system and may include a cash register and/or cash register-like computer components to enable purchase transactions. PoS device 400 also may be a hospitality point of sale system and include computerized systems incorporating registers, computers and peripheral equipment, usually on a computer network to be used in restaurant, hair salons, hotels or the like.

PoS device 400 may be a wireless point of sale device similar to a PoS device described herein or, for example a tablet computer that is configured to operate as a PoS device, including for example, software to cause the tablet computer to execute point of sale functionality and a card reader such as for example the Capital One® SparkPay card reader, the Square® reader, Intuit's® GoPayment reader, or the like. In this example, PoS device 400 may be connected to a mobile device such that the mobile device may act as a merchant system 150. A mobile device may include, for example, mobile device 140. PoS device 400 also may be a cloud-based point of sale system that can be deployed as software as a service, which can be accessed directly from the Internet using, for example, an Internet browser.

Referring to FIG. 4, an example PoS device 400 is shown. PoS device 400 may include a controller 402, a reader interface 404, a data interface 406, a smartcard and/or EMV chip reader 408, a magnetic stripe reader 410, a near-field communications (NFC) reader 412, a power manager 414, a keypad 416, an audio interface 418, a touchscreen/display controller 420, and a display 422. Also, PoS device 400 may be coupled with, integrated into or otherwise connected with a cash register/retail enterprise system 424.

In various embodiments, Controller 402 may be any controller or processor capable of controlling the operations of PoS device 400. For example, controller 402 may be an Intel® 2nd Generation Core™ i3 or i5 or Pentium™ G850 processor or the like. Controller 402 also may be a controller included in a personal computer, smartphone device, tablet PC or the like.

Reader interface 404 may provide an interface between the various reader devices associated with PoS device 400 and PoS device 400. For example, reader interface 404 may provide an interface between smartcard and/or EMV chip reader 408, magnetic stripe reader 410, NFC reader 412 and controller 402. In various embodiments, reader interface 404 may be a wired interface such as a USB, RS232 or RS485 interface and the like. Reader interface 404 also may be a wireless interface and implement technologies such as Bluetooth, the 802.11(x) wireless specifications and the like. Reader interface 404 may enable communication of information read by the various reader devices from the various reader devices to PoS device 400 to enable transactions. For example, reader interface 404 may enable communication of a credit or debit card number read by a reader device from that device to PoS device 400. In various embodiments, reader interface 404 may interface between PoS device 400 and other devices that do not necessarily "read" information but instead receive information from other devices.

Data interface 406 may allow PoS device 400 to pass communicate data throughout PoS device and with other devices including, for example, cash register/retail enterprise system 424. Data interface 406 may enable PoS device 400 to integrate with various customer resource management (CRM) and/or enterprise resource management (ERP) systems. Data interface 406 may include hardware, firmware and software that make aspects of data interface 406 a wired interface. Data interface 406 also may include hardware, firmware and software that make aspects of data interface 406 a wireless interface. In various embodiments, data interface 406 also enables communication between PoS device other devices.

Smartcard and/or EMV chip reader 408 may be any electronic data input device that connects to the contacts of an EMV chip on a transaction card. Through these connections EMV chip reader 408 may transmit power to the transaction card, read data from a transaction card and/or EMV chip, and send data to the transaction card and/or EMV chip. Smartcard and/or EMV chip reader 408 may be capable of supplying an integrated circuit (e.g., EMV chip) on the transaction card with electricity and communicating with the transaction card via protocols, thereby enabling read and write functions. In various embodiments, smartcard and/or EMV chip reader 408 may enable reading from contact or contactless transaction cards. Smartcard and/or EMV chip reader 408 also may communicate using standard protocols including ISO/IEC 7816, ISO/IEC 14443 and/or the like or proprietary protocols.

Magnetic stripe reader 410 may be any electronic data input device that reads data from a magnetic stripe on a transaction card, for example. In various embodiments, magnetic stripe reader 410 may include a magnetic reading head capable of reading information from a magnetic stripe. Magnetic stripe reader 410 may be capable of reading, for example, cardholder information from tracks 1, 2, and 3 on magnetic cards. In various embodiments, track 1 may be written on a card with code known as DEC SIXBIT plus odd parity and the information on track 1 may be contained in several formats (e.g., format A, which may be reserved for proprietary use of the card issuer; format B; format C-M which may be reserved for us by ANSI subcommittee X3B10; and format N-Z, which may be available for use by individual card issuers). In various embodiments, track 2 may be written with a 5-bit scheme (4 data bits plus I parity). Track 3 may be unused on the magnetic stripe. In various embodiments, track 3 transmission channels may be used for transmitting dynamic data packet information to further enable enhanced token-based payments.

NFC reader 412 may be any electronic data input device that reads data from a NFC device. In an example embodiment, NFC reader 412 may enable Industry Standard NFC Payment Transmission. For example, the NFC reader 412 may communicate with a NFC enabled device to enable two loop antennas to form an air-core transformer when placed near one another by using magnetic induction. NFC reader 412 may operate at 13.56 MHz or any other acceptable frequency. Also, NFC reader 412 may enable a passive communication mode, where an initiator device provides a carrier field, permitting answers by the target device via modulation of existing fields. Additionally, NFC reader 412 also may enable an active communication mode by allowing alternate field generation by the initiator and target devices.

In various embodiments, NFC reader 412 may deactivate an RF field while awaiting data. NFC reader 412 may receive communications containing Miller-type coding with varying modulations, including 100% modulation. NFC reader 412 also may receive communications containing Manchester coding with varying modulations, including a modulation ratio of approximately 10%, for example. Additionally, NFC reader 412 may be capable of receiving and transmitting data at the same time, as well as checking for potential collisions when the transmitted signal and received signal frequencies differ.

NFC reader 412 may be capable of utilizing standardized transmission protocols, for example but not by way of limitation, ISO/IEC 14443 A/B, ISO/IEC 18092, MiFare, FeliCa, tag/smartcard emulation, and the like. Also, NFC reader 412 may be able to utilize transmission protocols and methods that are developed in the future using other frequencies or modes of transmission. NFC reader 412 also may be backwards-compatible with existing payment techniques, such as, for example RFID. Also, NFC reader 412 may support transmission requirements to meet new and evolving payment standards including internet based transmission triggered by NFC. In various embodiments, NFC reader 412 may utilize MasterCard's® PayPass and/or Visa's® PayWave and/or American Express'® ExpressPay systems to enable transactions.

Although not shown and described, other input devices and/or readers, such as for example, barcode readers and the like are contemplated.

Power manager 414 may be any microcontroller or integrated circuit that governs power functions of PoS device 400. Power manager 414 may include, for example, firmware, software, memory, a CPU, a CPU, input/output functions, timers to measure intervals of time, as well as analog to digital converters to measure the voltages of the main battery or energy storage component of PoS device 400. In various embodiments, Power manager 414 remain active even when PoS device 400 is completely shut down, unused, and/or powered by the backup battery or energy storage component. Power manager 414 may be responsible for coordinating many functions, including, for example, monitoring power connections and battery or energy storage component charges, charging batteries when necessary, controlling power to other integrated circuits within PoS device 400 and/or other peripherals and/or readers, shutting down unnecessary system components when they are left idle, controlling sleep and power functions (on and off), managing the interface for built-in keypad and trackpads, and/or regulating a real-time clock (RTC).

Keypad 416 may any input device that includes a set of buttons arranged, for example, in a block or pad and may bear digits, symbols and/or alphabetical letters. Keypad 416 may be a hardware-based or mechanical-type keypad and/or implemented in software and displayed on, for example, a screen or touch screen to form a keypad. Keypad 416 may receive input from a user that pushed or otherwise activates one or more buttons on keypad 416 to provide input.

Audio interface 418 may be any device capable of providing audio signals from PoS device 400. For example, audio interface may be a speaker or speakers that may produce audio signals. In various embodiments, audio interface 418 may be integrated within PoS device 400. Audio interface 418 also may include components that are external to PoS device 400.

Touchscreen/display control 420 may be any device or controller that controls an electronic visual display. Touchscreen/display control 420 may allow a user to interact with PoS device 400 through simple or multi-touch gestures by touching a screen or display (e.g., display 422). Touchscreen/display control 420 may be configured to control any number of touchscreens, including, for example, resistive touchscreens, surface acoustic wave touchscreens, capacitive touchscreens, surface capacitance touchscreens, projected capacitance touchscreens, mutual capacitance touchscreens, self-capacitance touchscreens, infrared grid touchscreens, infrared acrylic projection touchscreens, optical touchscreens, touchscreens based on dispersive signal technology, acoustic pulse recognition touchscreens, and the like. In various embodiments, touchscreen/display control 420 may receive inputs from the touchscreen and process the received inputs. Touchscreen/display control 420 also may control the display on PoS device 400, thereby providing the graphical user interface on a display to a user of PoS device 400.

Display 422 may be any display suitable for a PoS device. For example, display 422 may be a TFT, LCD, LED or other display. Display 422 also may be a touchscreen display that for example allows a user to interact with PoS device 400 through simple or multi-touch gestures by touching a screen or display (e.g., display 422). Display 422 may include any number of touchscreens, including, for example, resistive touchscreens, surface acoustic wave touchscreens, capacitive touchscreens, surface capacitance touchscreens, projected capacitance touchscreens, mutual capacitance touchscreens, self-capacitance touchscreens, infrared grid touchscreens, infrared acrylic projection touchscreens, optical touchscreens, touchscreens based on dispersive signal technology, acoustic pulse recognition touchscreens, and the like. In various embodiments, 422 may receive inputs from control gestures provided by a user. Display 422 also may display images, thereby providing the graphical user interface to a user of PoS device 400.

Cash register/retail enterprise system 424 may me any device or devices that cooperate with PoS device 400 to process transactions. Cash register/retail enterprise system 424 may be coupled with other components of PoS device 400 via, for example, a data interface (e.g., data interface 406) as illustrated in FIG. 4. Cash register/retail enterprise system 424 also may be integrated into PoS device 400.

In various embodiments, cash register/retail enterprise system 424 may be a cash register. Example cash registers may include, for example, mechanical or electronic devices that calculate and record sales transactions. Cash registers also may include a cash drawer for storing cash and may be capable of printing receipts. Cash registers also may be connected to a network to enable payment transactions. Cash registers may include a numerical pad, QWERTY or custom keyboard, touch screen interface, or a combination of these input methods for a cashier to enter products and fees by hand and access information necessary to complete the sale.

In various embodiments, cash register/retail enterprise system 424 may comprise a retail enterprise system and/or a customer relationship management system. Retail enterprise system 424 may enable retain enterprises to manage operations and performance across a retail operation. Retail enterprise system 424 may be a stand-alone application in, for example, individual stores, or may be interconnected via a network. Retail enterprise system 424 may include various point of sale capabilities, including the ability to, for example, customize and resize transaction screens, work with a "touch screen" graphical user interface, enter line items, automatically look up price (sales, quantity discount, promotional, price levels), automatically compute tax, VAT, look up quantity and item attribute, display item picture, extended description, and sub-descriptions, establish default shipping services, select shipping carrier and calculate shipping charges by weight/value, support multi-tender transactions, including cash, check, credit card, and debit card, accept food stamps, place transactions on hold and recall, perform voids and returns at PoS, access online credit card authorizations and capture electronic signatures, integrate debit and credit card processing, ensure optional credit card discounts with address verification, support mix-and-match pricing structure, discount entire sale or selected items at time of sale, add customer account, track customer information, including total sales, number of visits, and last visit date. issue store credit, receive payment(s) for individual invoices, process deposits on orders, search by customer's ship-to address, create and process layaway, back orders, work orders, and sales quotes, credit items sold to selected sales reps, view daily sales graph at the PoS, view and print journals from any register, preview, search, and print journals by register, batch, and/or receipt number, print X, Z, and ZZ reports, print receipts, invoices, and pick tickets with logos/graphics, print kit components on receipt, reprint receipts, enter employee hours with an integrated time clock function, and/or sell when the network/server is down with an offline PoS mode. Retail enterprise system 424 also may include inventory control and tracking capabilities, reporting tools, customer management capabilities, employee management tools, and may integrate with other accounting software.

In various embodiments cash register/retail enterprise system 424 may be a hospitality PoS. In such embodiments, retail enterprise system 424 may include hospitality PoS software (e.g., Aloha PoS Restaurant software from NCR®, Micros® RES and Symphony software and the like), hospitality management software, and other hardware and software to facilitate hospitality operations.

Figure 5:
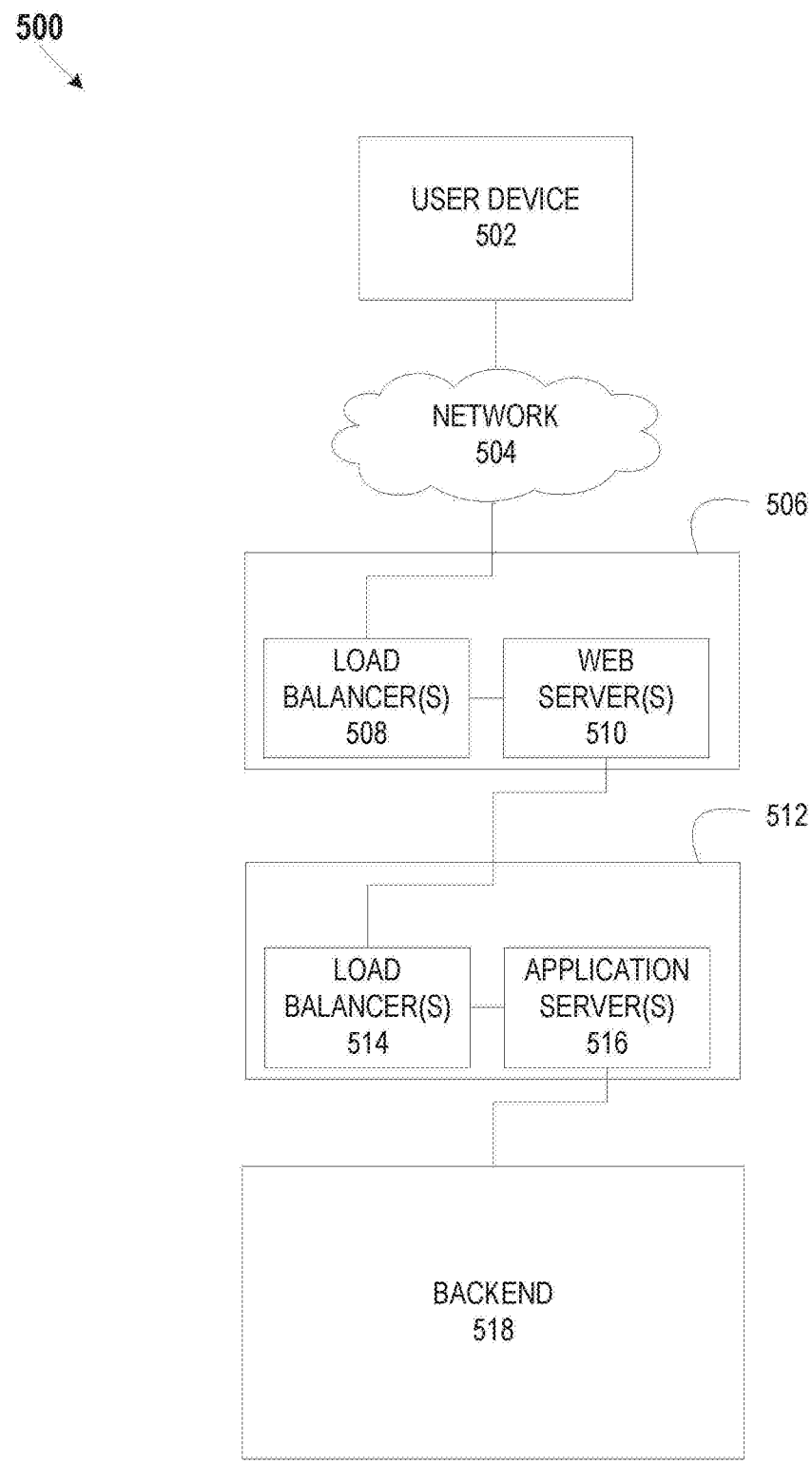
FIG. 5 depicts an example backend system and user device that may interact with a dynamic transaction card to create, monitor, and/or transmit data associated with the dynamic transaction card as input to optimize operational configurations and/or a user experience of the dynamic transaction card, detect system and/or device defects, and extend an energy storage life of the dynamic transaction card, according to embodiments of the disclosure.

Returning to FIG. 1, backend system 130 may include a backend system that communicates with a mobile device 140 as described in FIG. 5. For example, system 500 may include a user device 502, which may be similar to mobile device 140, a network 504, which may be similar to network 110, a front-end controlled domain 506, a back-end controlled domain 512, and a backend 518, which may be similar to backend system 130. Front-end controlled domain 506 may include one or more load balancers 508 and one or more web servers 510. Back-end controlled domain 512 may include one or more load balancers 514 and one or more application servers 516.

User device 502 may be a network-enabled computer. As referred to herein, a network-enabled computer may include, but is not limited to: e.g., any computer device, or communications device including, e.g., a server, a network appliance, a personal computer (PC), a workstation, a mobile device, a phone, a handheld PC, a personal digital assistant (PDA), a thin client, a fat client, an Internet browser, or other device. The one or more network-enabled computers of the example system 400 may execute one or more software applications to enable, for example, network communications.

User device 502 may include an iPhone, iPod, iPad, and/or Apple Watch from Apple® or any other mobile device running Apple's iOS operating system, any device running Google's Android® operating system, including for example, Google's wearable device, Google Glass, any device running Microsoft's Windows® Mobile operating system, and/or any other smartphone or like wearable mobile device.

Network 504 may be one or more of a wireless network, a wired network, or any combination of a wireless network and a wired network. For example, network 404 may include one or more of a fiber optics network, a passive optical network, a cable network, an Internet network, a satellite network, a wireless LAN, a Global System for Mobile Communication (GSM), a Personal Communication Service (PCS), a Personal Area Networks, (PAN), D-AMPS, Wi-Fi, Fixed Wireless Data, IEEE 802.11b 802.15.1, 802.11n, and 802.11g or any other wired or wireless network for transmitting and receiving a data signal.

In addition, network 504 may include, without limitation, telephone lines, fiber optics, IEEE Ethernet 902.3, a wide area network (WAN), a local area network (LAN) or a global network such as the Internet. Also, network 504 may support an Internet network, a wireless communication network, a cellular network, or the like, or any combination thereof. Network 504 may further include one network, or any number of example types of networks mentioned above, operating as a stand-alone network or in cooperation with each other. Network 504 may utilize one or more protocols of one or more network elements to which they are communicatively couples. Network 504 may translate to or from other protocols to one or more protocols of network devices. Although network 504 is depicted as a single network, it should be appreciated that according to one or more embodiments, network 404 may comprise a plurality of interconnected networks, such as, for example, the Internet, a service provider's network, a cable television network, corporate networks, and home networks.

Front-end controlled domain 506 may be implemented to provide security for backend 518. Load balancer(s) 508 may distribute workloads across multiple computing resources, such as, for example computers, a computer cluster, network links, central processing units or disk drives. In various embodiments, load balancer(s) 510 may distribute workloads across, for example, web server(s) 516 and/or backend 518 systems. Load balancing aims to optimize resource use, maximize throughput, minimize response time, and avoid overload of any one of the resources. Using multiple components with load balancing instead of a single component may increase reliability through redundancy. Load balancing is usually provided by dedicated software or hardware, such as a multilayer switch or a Domain Name System (DNS) server process.

Load balancer(s) 508 may include software that monitoring the port where external clients, such as, for example, user device 502, connect to access various services of a financial institution, for example. Load balancer(s) 508 may forward requests to one of the application servers 516 and/or backend 518 servers, which may then reply to load balancer 508. This may allow load balancer(s) 508 to reply to user device 502 without user device 502 ever knowing about the internal separation of functions. It also may prevent mobile devices from contacting backend servers directly, which may have security benefits by hiding the structure of the internal network and preventing attacks on backend 518 or unrelated services running on other ports, for example.

A variety of scheduling algorithms may be used by load balancer(s) 508 to determine which backend server to send a request to. Simple algorithms may include, for example, random choice or round robin. Load balancers 508 also may account for additional factors, such as a server's reported load, recent response times, up/down status (determined by a monitoring poll of some kind), number of active connections, geographic location, capabilities, or how much traffic it has recently been assigned.

Load balancers 508 may be implemented in hardware and/or software. Load balancer(s) 508 may implement numerous features, including, without limitation: asymmetric loading; Priority activation: SSL Offload and Acceleration; Distributed Denial of Service (DDoS) attack protection; HTTP/HTTPS compression; TCP offloading; TCP buffering; direct server return; health checking; HTTP/HTTPS caching; content filtering; HTTP/HTTPS security; priority queuing; rate shaping; content-aware switching; client authentication; programmatic traffic manipulation; firewall; intrusion prevention systems.

Web server(s) 510 may include hardware (e.g., one or more computers) and/or software (e.g., one or more applications) that deliver web content that can be accessed by, for example a client device (e.g., user device 502) through a network (e.g., network 504), such as the Internet. In various examples, web servers, may deliver web pages, relating to, for example, online banking applications and the like, to clients (e.g., user device 502). Web server(s) 51.0 may use, for example, a hypertext transfer protocol (HTTP/HTTPS or sHTTP) to communicate with user device 502. The web pages delivered to client device may include, for example, HTML documents, which may include images, style sheets and scripts in addition to text content.

A user agent, such as, for example, a web browser, web crawler, or native mobile application, may initiate communication by making a request for a specific resource using HTTP/HTTPS and web server 510 may respond with the content of that resource or an error message if unable to do so. The resource may be, for example a file on stored on backend 518. Web server(s) 510 also may enable or facilitate receiving content from user device 502 so user device 502 may be able to, for example, submit web forms, including uploading of files.

Web server(s) also may support server-side scripting using, for example, Active Server Pages (ASP), PHP, or other scripting languages. Accordingly, the behavior of web server(s) 510 can be scripted in separate files, while the actual server software remains unchanged.

Load balancers 514 may be similar to load balancers 408 as described above.

Application server(s) 516 may include hardware and/or software that is dedicated to the efficient execution of procedures (e.g., programs, routines, scripts) for supporting its applied applications. Application server(s) 516 may comprise one or more application server frameworks, including, for example, Java application servers (e.g., Java platform, Enterprise Edition (Java EE), the .NET framework from Microsoft®, PHP application servers, and the like). The various application server frameworks may contain a comprehensive service layer model. Also, application server(s) 516 may act as a set of components accessible to, for example, a financial institution, or other entity implementing system 500, through an API defined by the platform itself. For Web applications, these components may be performed in, for example, the same running environment as web server(s) 510, and application servers 416 may support the construction of dynamic pages. Application server(s) 516 also may implement services, such as, for example, clustering, fail-over, and load-balancing. In various embodiments, where application server(s) 516 are Java application servers, the web server(s) 516 may behaves like an extended virtual machine for running applications, transparently handling connections to databases associated with backend 518 on one side, and, connections to the Web client (e.g., user device 402) on the other.

Backend 518 may include hardware and/or software that enables the backend services of, for example, a financial institution, merchant, or other entity that maintains a distributed system similar to system 500. For example, backend 518 may include, a system of record, online banking applications, encryption applications, BLE/Bluetooth connection platforms, a rewards platform, a payments platform, a lending platform, including the various services associated with, for example, auto and home lending platforms, a statement processing platform, one or more platforms that provide mobile services, one or more platforms that provide online services, a card provisioning platform, a general ledger system, and/or a location system, which may include additional capabilities, such as transaction card data generation, transaction processing, and/or transmission of account and/or transaction data. Backend 518 may be associated with various databases, including account databases that maintain, for example, cardholder information (e.g., demographic data, credit data, cardholder profile data, and the like), transaction card databases that maintain transaction card data (e.g., transaction history, account balance, spending limit, budget categories, budget spending, budget limits, and the like), connection information (e.g., public/private key pairs, UUIDs, device identifiers, and the like) and the like. Backend 518 also may be associated with one or more servers that enable the various services provided by system 500. Backend 518 may enable a financial institution to implement various functions associated with reprogramming a transaction card and/or providing data to a dynamic transaction card to provide optimal configurations as described herein.

For example, FIGS. 6 and 7 illustrate example methods that use data associated with a dynamic transaction card as input to optimize operational configurations and/or a user experience of the dynamic transaction card, detect system and/or device defects, and extend an energy storage life of the dynamic transaction card.

Process 600 may begin at block 602. At block 604, a dynamic transaction card may use a microcontroller and/or sensor within the dynamic transaction card to monitor configuration and/or functionality data. Configuration and/or functionality data associated with the power components may include, for example, sensor input (e.g., a number of taps, a number of double taps, time between double taps, fingerprint, PIN or password input, light sensor threshold, and/or the like), connection data (e.g., connection attempts, connection length, time in advertising mode, time in scanning mode, and/or the like), transaction data (e.g., contactless transaction attempts, time per contactless transaction, contact transaction attempts, time per contact transactions, and/or the like), display data (e.g., light brightness, light active time, display brightness, display contrast, display active time, and/or the like), and/or the like.

Dynamic transaction card may transmit configuration and/or functionality data to a mobile device, merchant system, and/or backend system via the systems and/or methods described herein, utilizing JSON and/or XML. For example, configuration and/or functionality data may be transmitted to a mobile device, merchant system, and/or backend system as a portion of transaction data, such as metadata. In this manner, mobile device, merchant system, and/or backend system may monitor configuration and/or functionality data. Dynamic transaction card users may be segmented into user groups based on similar card usage patterns and device configurations, and the associated configuration and/or functionality data may clustered together for each user group segment for optimal configuration processing to generate an optimal configuration per user group segment, which may utilize an alternating least squares algorithm. The transaction card user segmentation may be automatically updated in real time base on changes in card usage and/or device configurations. In block 606, the configuration and/or functionality data may be stored. Configuration and/or functionality data may be stored in a dynamic transaction card, such as in a microprocessor, EMV chip, and/or data storage. Configuration and/or functionality data may be stored in data storage associated with a merchant system, backend system, and/or mobile device.

Transmission of data between a dynamic transaction card and a user device and/or backend system may be performed at any interval. For example, transmission of data may occur on an hourly, daily, and/or other timed interval. Transmission of data may occur on an event basis, such as at each transaction, a number of transactions, a number of power-ups of a dynamic transaction card, a number of waking-ups of a dynamic transaction card, and/or the like.

In block 608, optimal configurations may be calculated by a processor using the configuration and/or functionality data. Optimal configurations may be determined by linear regression, logistic regression, ridge regression, lasso regression, Bayesian regression, machine learning algorithms, and/or the like. Optimal configurations may be calculated on a device-by-device basis, a grouping of devices (e.g., grouping by demographic data, grouping by geolocation data, grouping by usage, grouping by software revisions, grouping by hardware differences such as a device generation, and/or the like), and or the entirety of dynamic transaction cards. Optimal configurations may include a display/lighting brightness, a display/lighting contrast, a sensor sensitivity threshold, a time between receiving input and sleeping, a time between receiving input and disconnecting from a network, and/or the like.

Optimization of data may be performed at any interval. For example, optimization of data may occur on an hourly, daily, and/or other timed interval. Optimization of data may occur on an event basis, such as a number of transactions, a number of power-ups of a dynamic transaction card, a number of waking-ups of a dynamic transaction card, and/or the like.

Extended energy storage life and/or a particular user experience may be determined based on the optimal configurations. For example, the configuration and/or functionality data may be optimized in order to determine a maximum energy storage life for a dynamic transaction card, promote various behaviors, and/or detect system and/or device defects. For example, to extend an energy storage life, various lighting, brightness, and/or power usage card settings may be altered. As another example, a user experience may be optimized based on card configuration and/or functionality data by comparing configurations and/or functionality data (e.g., time a balance is illuminated on a card display, number of alerts displayed per transaction, and/or the like) associated with a particular user behavior stored in a backend system (e.g., sticking to a budget, always paying a bill on time, maintaining a particular balance, and/or the like). In this manner, where a particular configuration and/or functionality of a card results in a particular behavior and/or a high likelihood of achieving a particular behavior, the particular configuration and/or functionality data associated with the behavior may be pushed to a card, a grouping of cards, and/or an entirety of cards in order to optimize the desired user behavior. Configuration and/or functionality data may be optimized in order to determine a maximum transaction attempts. Without the data generated by the dynamic transaction card(s), the dynamic transaction cards may not be optimized in order to determine defects and/or optimize an energy storage life and/or user experience.

At block 610, optimal configurations may be transmitted from a processor via a network to at least one dynamic transaction card. The optimal configurations may be transmitted to a particular transaction card, a particular grouping of transaction cards, and/or an entirety of dynamic transaction cards. Optimal configurations may be transmitted via a network connection as described herein. Optimal configurations may be pushed to a dynamic transaction card using an EMV Issuer script. For example, an EMV Issuer script may be used to update and/or change configurations and/or values on the EMV chip. An EMV Issuer script may include an Issuer Script Identifier and/or an Issuer Script Command, which may be received in, for example, an authorization response message. A terminal (e.g., a merchant system, a mobile device, and/or the like) may apply the EMV Issuer script during the completion of a transaction via the contacts of an EMV chip. In this manner, an issuer (e.g., backend system) alters EMV chip using data (e.g., optimal configuration data and/or values).

At block 612, configuration and/or functionality data may be monitored by a dynamic transaction card associated with the transmitted optimal configurations, similar to the monitoring in block 604. In this manner, configuration and/or functionality data may be continuously monitored and optimized to promote a desired card functionality and/or user behavior. At block 614, the process may end.

Process 700 may begin at block 702. At block 704, dynamic transaction card may use a microcontroller within the dynamic transaction card to monitor configuration and/or functionality data. Configuration and/or functionality data associated with the power components may include, for example, sensor input (e.g., a number of taps, a number of double taps, time between double taps, fingerprint, PIN or password input, light sensor threshold, and/or the like), connection data (e.g., connection attempts, connection length, time in advertising mode, time in scanning mode, and/or the like), transaction data (e.g., contactless transaction attempts, time per contactless transaction, contact transaction attempts, time per contact transactions, and/or the like), display data (e.g., light brightness, light active time, display brightness, display contrast, display active time, and/or the like), and/or the like.

Dynamic transaction card may transmit via a network configuration and/or functionality data to mobile device, merchant system, and/or backend system via the systems and/or methods described herein. In this manner, mobile device, merchant system, and/or backend system may monitor configuration and/or functionality data. Transmission of data between a dynamic transaction card and a user device and/or backend system may be performed at any interval. For example, transmission of data may occur on an hourly, daily, and/or other timed interval. Transmission of data may occur on an event basis, such as a number of transactions, a number of power-ups of a dynamic transaction card, a number of waking-ups of a dynamic transaction card, and/or the like.

In block 706, the configuration and/or functionality data may be stored. Configuration and/or functionality data may be stored in a dynamic transaction card, such as in a microprocessor, EMV chip, and/or data storage. Configuration and/or functionality data may be stored in data storage associated with a merchant system, backend system, and/or mobile device. Configuration and/or functionality data may be transmitted to via a network and stored on a mobile device, merchant system, and/or backend system as a portion of transaction data, such as metadata.

In block 708, optimal configurations may be calculated by a processor using the configuration and/or functionality data. Optimal configurations may be determined by linear regression, logistic regression, ridge regression, lasso regression, Bayesian regression, machine learning algorithms, and/or the like. Optimal configurations may be calculated on a device-by-device basis, a grouping of devices based on cluster segmentation (e.g., grouping by demographic data, grouping by geolocation data, grouping by usage, grouping by software revisions, grouping by hardware differences such as a device generation, and/or the like), and or the entirety of dynamic transaction cards. Optimal configurations may include a display/lighting brightness, a display/lighting contrast, a sensor sensitivity threshold, a time between receiving input and sleeping, a time between receiving input and disconnecting from a network, and/or the like.

Optimal configurations may be based on a desired user behavior. For example, a user experience may be optimized based on card configuration and/or functionality data by comparing configurations and/or functionality data (e.g., time a balance is illuminated on a card display, number of alerts displayed per transaction, and/or the like) associated with a particular user behavior stored in a backend system (e.g., sticking to a budget, always paying a bill on time, maintaining a particular balance, and/or the like). In this manner, a system may determine that a particular configuration and/or functionality of a card results in a particular behavior and/or a high likelihood of achieving a particular behavior.

At block 710, outliers may be identified based on the calculated optimal configurations by a processor. Outliers may indicate a system defect associated with a particular mobile device and/or merchant system such as a network defect resulting in an extended network connection time, a system defect resulting in extended transaction times, and/or the like. Outliers may indicate device defects and/or user error. System defects may be determined by determining and detecting outlier data associated with transaction card transaction data. Device defects and/or user error may be determined by determining and detecting outlier data associated with any configuration and/or functionality data for a particular device.

At block 712, outlier data including any potential defect explanation and/or alerts may be transmitted from a processor via a network to a device associated with the outlier, a backend system associated with a device having outlier data, and/or a mobile device associated with a device having outlier data. In this manner, devices with defects may be marked, monitored, replaced, and/or repaired based on the detected defect. Where a device with a defect and/or user error includes a dynamic transaction card, defect and/or user error data may be transmitted to a dynamic transaction card using EMV Issuer scripts. For example, an EMV Issuer script may be used to update and/or change configurations and/or values (e.g., display values) stored on the EMV chip. An EMV Issuer script may include an Issuer Script Identifier and/or an Issuer Script Command, which may be received in, for example, an authorization response message. A terminal (e.g., a merchant system, a mobile device, and/or the like) may apply the EMV Issuer script during the completion of a transaction via the contacts of an EMV chip. In this manner, an issuer (e.g., backend system) alters EMV chip using data (defect and/or error data). At block 714, the process may end.

The present disclosure is not to be limited in terms of the particular embodiments described in this application, which are intended as illustrations of various aspects. Many modifications and variations can be made without departing from its spirit and scope, as may be apparent. Functionally equivalent methods and apparatuses within the scope of the disclosure, in addition to those enumerated herein, may be apparent from the foregoing representative descriptions. Such modifications and variations are intended to fall within the scope of the appended representative claims. The present disclosure is to be limited only by the terms of the appended representative claims, along with the full scope of equivalents to which such representative claims are entitled. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It may be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It may be further understood by those within the art that if a specific number of an introduced claim recitation is intended, such an intent may be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It may be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" may be understood to include the possibilities of "A" or "B" or "A and B."

The foregoing description, along with its associated embodiments, has been presented for purposes of illustration only. It is not exhaustive and does not limit the invention to the precise form disclosed. Those skilled in the art may appreciate from the foregoing description that modifications and variations are possible in light of the above teachings or may be acquired from practicing the disclosed embodiments. For example, the steps described need not be performed in the same sequence discussed or with the same degree of separation. Likewise various steps may be omitted, repeated, or combined, as necessary, to achieve the same or similar objectives. Accordingly, the invention is not limited to the above-described embodiments, but instead is defined by the appended claims in light of their full scope of equivalents.

In the preceding specification, various preferred embodiments have been described with references to the accompanying drawings. It may, however, be evident that various modifications and changes may be made thereto, and additional embodiments may be implemented, without departing from the broader scope of the invention as set forth in the claims that follow. The specification and drawings are accordingly to be regarded as an illustrative rather than restrictive sense.

The invention claimed is:

1. A dynamic transaction card comprising:
a microcontroller;
one or more card components; and
memory storing instructions that, when executed by the microcontroller, cause the microcontroller to:
monitor the one or more card components to determine operational card configurations for the dynamic transaction card;
transmit the operational card configurations to a remote processor associated with a mobile device, a merchant system, or a backend system;
receive optimal card configurations from the remote processor;
store the optimal card configurations in the memory; and
apply the optimal card configurations to at least one of the one or more card components.

2. The dynamic transaction card of claim 1, wherein:
the one or more card components comprise a display;
the operational card configurations include at least one of a display brightness, a display active time, or a display contrast; and
the optimal card configurations include at least one of an optimal display brightness, an optimal display active time, or an optimal display contrast.

3. The dynamic transaction card of claim 1, wherein:
the one or more card components comprise a sensor;
the operational card configurations include at least one of a sensor sensitivity threshold, a duration of time between receiving an input from the sensor and deactivating the dynamic transaction card, or a duration of time between receiving an input from the sensor and disconnecting the dynamic transaction card from a network; and
the optimal card configurations include at least one of an optimal sensor sensitivity threshold, an optimal duration of time between receiving an input from the sensor and deactivating the dynamic transaction card, or an optimal duration of time between receiving an input from the sensor and disconnecting the dynamic transaction card from a network.

4. The dynamic transaction card of claim 1, wherein:
the one or more card components comprise a light sensor for detecting ambient light and activating the dynamic transaction card;
the operational card configurations include a light sensor sensitivity threshold to activate the dynamic transaction card; and
the optimal card configurations include an optimal light sensor sensitivity to activate the dynamic transaction card.

5. The dynamic transaction card of claim 1, wherein:
the one or more card components comprise a capacitive touch sensor for detecting a physical tap and activating the dynamic transaction card;
the operational card configurations include at least one of a number of taps to activate the dynamic transaction card or a time between taps to activate the dynamic transaction card; and
the optimal card configurations include at least one of an optimal number of taps to activate the dynamic transaction card or an optimal time between taps to activate the dynamic transaction card.

6. The dynamic transaction card of claim 1, wherein:
the one or more card components comprise a battery;
the operational card configurations include a duration of time between an activation state and a sleep state for the dynamic transaction card; and
the optimal card configurations include an optimal duration of time between an activation state and a sleep state for the dynamic transaction card to preserve power for the battery.

7. The dynamic transaction card of claim 1, wherein the optimal card configurations are calculated by the remote processor to minimize energy consumption by the dynamic transaction card and calculated using the operational card configurations.

8. The dynamic transaction card of claim 1, wherein:
the optimal card configurations are calculated at the remote processor for a user group segment; and
the user group segment comprises a plurality of dynamic transaction cards with at least one common feature.

9. The dynamic transaction card of claim 8, wherein the at least one common feature comprises at least one of geolocation data, software versions, or hardware characteristics associated with the plurality of dynamic transaction cards.

10. The dynamic transaction card of claim 1, wherein the optimal card configurations are calculated by the remote processor based on user preferences stored in a data storage associated with the remote processor.

11. A method comprising:
monitoring, with a microcontroller of a dynamic transaction card, one or more card components to determine operational card configurations for the dynamic transaction card;
transmitting, over a network, the operational card configurations to a remote processor associated with a mobile device, a merchant system, or a backend system;
receiving, at the microcontroller, optimal card configurations from the remote processor; and
applying the optimal card configurations to at least one of the one or more card components.

12. The method of claim 11, wherein:
the one or more card components comprise a display;
the operational card configurations include at least one of a display brightness, a display active time, or a display contrast; and
the optimal card configurations include at least one of an optimal display brightness, an optimal display active time, or an optimal display contrast.

13. The method of claim 11, wherein:
the one or more card components comprise a sensor;
the operational card configurations include at least one of a sensor sensitivity threshold, a duration of time between receiving an input from the sensor and deactivating the dynamic transaction card, or a duration of time between receiving an input from the sensor and disconnecting the dynamic transaction card from a network; and the optimal card configurations include at least one of an optimal sensor sensitivity threshold, an optimal duration of time between receiving an input from the sensor and deactivating the dynamic transaction card, or an optimal duration of time between receiving an input from the sensor and disconnecting the dynamic transaction card from a network.

14. The method of claim 11, wherein:

the one or more card components comprise a light sensor for detecting ambient light and activating the dynamic transaction card;

the operational card configurations include a light sensor sensitivity threshold to activate the dynamic transaction card; and the optimal card configurations include an optimal light sensor sensitivity to activate the dynamic transaction card.

15. The method of claim 11, wherein:

the one or more card components comprise a capacitive touch sensor for detecting a physical tap and activating the dynamic transaction card;

the operational card configurations include at least one of a number of taps to activate the dynamic transaction card or a time between taps to activate the dynamic transaction card; and the optimal card configurations include at least one of an optimal number of taps to activate the dynamic transaction card or an optimal time between taps to activate the dynamic transaction card.

16. The method of claim 11, wherein:

the one or more card components comprise a battery;

the operational card configurations include a duration of time between an activation state and a sleep state for the dynamic transaction card; and the optimal card configurations include an optimal duration of time between an activation state and a sleep state for the dynamic transaction card to preserve power for the battery.

17. The method of claim 11, wherein the optimal card configurations are calculated by the remote processor to minimize energy consumption by the dynamic transaction card and calculated using the operational card configurations.

18. The method of claim 11, wherein:

the optimal card configurations are calculated at the remote processor for a user group segment; and the user group segment comprises a plurality of dynamic transaction cards with at least one common feature.

19. The method of claim 18, wherein the at least one common feature comprises at least one of geolocation data, software versions, or hardware characteristics associated with the plurality of dynamic transaction cards.

20. The method of claim 11, wherein the optimal card configurations are calculated by the remote processor based on user preferences stored in a data storage associated with the remote processor.

* * * * *